US011513959B2

(12) United States Patent
Simionescu et al.

(10) Patent No.: US 11,513,959 B2
(45) Date of Patent: Nov. 29, 2022

(54) MANAGING COLLISIONS IN A NON-VOLATILE MEMORY SYSTEM WITH A COHERENCY CHECKER

(71) Applicant: Micron Technology, Inc., Boise, ID (US)

(72) Inventors: Horia C. Simionescu, Foster City, CA (US); Lyle E. Adams, San Jose, CA (US); Yongcai Xu, Fremont, CA (US); Mark Ish, San Ramon, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 17/185,059

(22) Filed: Feb. 25, 2021

(65) Prior Publication Data
US 2021/0182199 A1 Jun. 17, 2021

Related U.S. Application Data

(63) Continuation of application No. 16/435,282, filed on Jun. 7, 2019, now Pat. No. 10,936,496.

(51) Int. Cl.
*G06F 12/08* (2016.01)
*G06F 12/0855* (2016.01)

(52) U.S. Cl.
CPC ...... *G06F 12/0857* (2013.01); *G06F 12/0855* (2013.01); *G06F 2212/1016* (2013.01)

(58) Field of Classification Search
CPC .................. G06F 12/0855; G06F 12/0857
USPC .......................................... 711/118
See application file for complete search history.

(56) References Cited

U.S. PATENT DOCUMENTS

| 8,782,435 | B1 * | 7/2014 | Ghose ................. G06F 21/52 |
| | | | 712/216 |
| 9,606,938 | B1 | 3/2017 | Armangau et al. |
| 9,846,655 | B1 | 12/2017 | Zhao et al. |
| 2002/0178210 | A1 | 11/2002 | Khare et al. |

(Continued)

FOREIGN PATENT DOCUMENTS

| CN | 1860452 A | 11/2006 |
| CN | 101154192 A | 4/2008 |

(Continued)

OTHER PUBLICATIONS

International Search Report and Written Opinion, PCT App. No. PCT/US2020/034579, dated Aug. 28, 2020, 10 pages.

(Continued)

*Primary Examiner* — Than Nguyen
(74) *Attorney, Agent, or Firm* — Nicholson De Vos Webster & Elliott LLP

(57) ABSTRACT

A request to read data from a location associated with a memory component is received. The request is assigned a first tag, the first tag having a first identifier of a first buffer to store data read from the location. The request to read data is determined to collide with an earlier request to write data to the location. The earlier request is assigned a second tag, the second tag having a second identifier of a second buffer to store data to write to the location. An attempt to lock the second tag and the second buffer for the request to read data is made. The request to read data is fulfilled from the second buffer in response to a successful attempt to lock the second tag and the second buffer.

20 Claims, 15 Drawing Sheets

(56) References Cited

U.S. PATENT DOCUMENTS

| | | |
|---|---|---|
| 2005/0033924 A1 | 2/2005 | Glasco |
| 2010/0257322 A1 | 10/2010 | Isherwood et al. |
| 2014/0149689 A1 | 5/2014 | Blaner et al. |
| 2017/0192889 A1* | 7/2017 | Sato ..................... G06F 3/0659 |
| 2018/0150364 A1 | 5/2018 | Parakh et al. |
| 2019/0138313 A1 | 5/2019 | Lin |
| 2020/0250087 A1* | 8/2020 | Bono .................... G06F 9/5016 |
| 2020/0387449 A1* | 12/2020 | Simionescu ........ G06F 12/0855 |

FOREIGN PATENT DOCUMENTS

| | | |
|---|---|---|
| CN | 108874701 A | 11/2018 |
| KR | 10-2011-0100659 A | 9/2011 |

OTHER PUBLICATIONS

Non-Final Office Action, U.S. Appl. No. 16/435,282, dated Jun. 22, 2020, 9 pages.

Notice of Allowability, U.S. Appl. No. 16/435,282, dated Nov. 2, 2020, 7 pages.

First Office Action for CN Application No. 202080041178.4, dated Apr. 13, 2022, 9 pages.

\* cited by examiner

| BUFFER IDENTIFIER 205 | | | | |
|---|---|---|---|---|
| NEXT SYSTAG IDENTIFIER 210 | LENGTH 215 | BI EXT. 220 | | |
| LOGICAL ADDRESS 225 | | | | |
| PENDING SYSTAG IDENTIFIER 230 | HOST IDENTIFIER 235 | LA EXT. 240 | | |
| RESERVED 245 | | BITMAP 250 | | |

FIG. 2

MANAGING COLLISIONS IN A NON-VOLATILE MEMORY SYSTEM WITH A COHERENCY CHECKER

CROSS-REFERENCE TO RELATED APPLICATIONS

This application is a continuation of U.S. patent application Ser. No. 16/435,282, filed Jun. 7, 2019, which is hereby incorporated by reference.

TECHNICAL FIELD

The present disclosure generally relates to a non-volatile memory system, and more specifically, relates to handling operation collisions with a coherency checker.

BACKGROUND ART

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory subsystem to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 illustrates an example system tag frame in accordance with some embodiments of the present disclosure.

DETAILED DESCRIPTION

Figure 1:
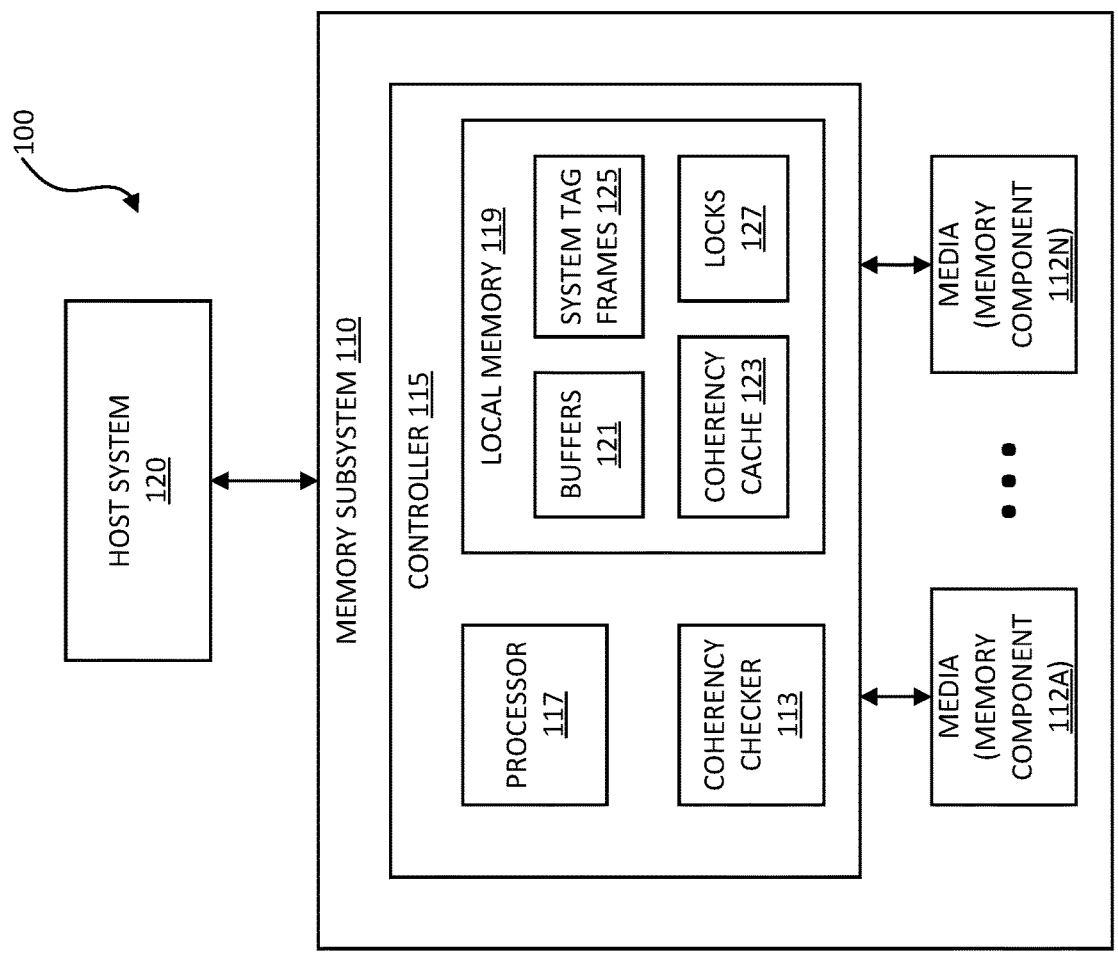
FIG. 1 illustrates an example computing environment that includes a memory subsystem in accordance with some embodiments of the present disclosure.

Aspects of the present disclosure are directed to a coherency checker in a memory subsystem. A memory subsystem is also hereinafter referred to as a "memory device." An example of a memory subsystem is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory subsystem is a storage device that is connected to the central processing unit (CPU) via a peripheral interconnect (e.g., an input/output bus, a storage area network, etc.). Examples of storage devices include a solid-state drive (SSD), a flash drive, a universal serial bus (USB) flash drive, and a hard disk drive (HDD). In some embodiments, the memory subsystem is a hybrid memory/storage subsystem. In general, a host system can utilize a memory subsystem that includes one or more memory components. The host system can provide data to be stored at the memory subsystem and can request data to be retrieved from the memory subsystem.

In modern memory subsystems, a memory controller decouples the host system from the memory components. Such decoupling allows the memory controller to manage the overall flow of host commands to store or retrieve data without requiring intervention by the host system. For example, the host system can issue a write command to a memory subsystem that directs the memory subsystem to a location in host memory that contains the data to be written into the memory subsystem. The memory controller can transfer the data from the host memory into a buffer in a local memory and, sometime later, transfer the buffered data into a memory component. Similarly, the host system can issue a read command to a memory subsystem that directs the memory subsystem to a location in host memory where the read data should be stored. The memory controller can queue a read operation to transfer the data from a memory component into a buffer in a local memory and, sometime later, transfer the buffered data to the location in the host memory.

As part of managing storage and retrieval operations, the memory controller can process commands out of order to improve the performance of the memory subsystem. For example, the memory controller can buffer data associated with several smaller write commands into a local memory before transferring the buffered data to a memory component in a single large write operation. Prior to committing the data associated with an operation to the memory component, the associated command can be considered "in-flight." However, during the time that a write command is in-flight, the memory controller can receive a read command directed to the same address. Absent collision avoidance or management techniques, processing the read command before the in-flight write command can result in the memory subsystem returning erroneous data.

Additionally, several uncoordinated processes (whether executing on a processor of the host system or of the memory subsystem) can issue commands that involve operations such as allocating and releasing various buffers for data in local memory, updating data structures that track the progression of data from the host to memory components (or vice versa), freeing space in memory components for future writes, and the like. As the number of potential issuers of read or write commands increases, the likelihood of collisions increases. One technique to avoid the return of erroneous data involves blocking subsequent commands any time a collision occurred. As collisions become more frequent, however, the performance gains associated with out of order processing would be limited or nullified by such blocking.

Aspects of the present disclosure address the above and other deficiencies by implementing a coherency checker ("CC"). The CC uses a cache structure to serialize requests which can be being processed out of order by the memory subsystem. As a result, the CC allows the fulfillment of read operations directed to the same address as earlier, in-flight write operations with limited operation blocking. In some embodiments, the cache structure can be implemented as an N-way associative cache, allowing each address to reside in up to N slots. The CC checks whether read or write operations collide with operations referenced in the cache. Depending on the nature of the collision, the CC imposes a lock on one or more regions of memory that contain data or metadata associated with the colliding operations to allow the read or write operation to reference data or metadata associated with the operation in the cache that caused the collision, for example. To extend the cache structure beyond N slots, some embodiments implement a cache extension feature that extends the size of the cache structure by repurposing existing data structures typically used to track metadata associated with operations to include additional cache entries. In some embodiments, the coherency checker can operate at a natural block-size of the memory components or at a sub-block size provided for the host system. In the case of sub-blocks, the CC and cache structure allow sub-block write operations to be merged. In some embodiments, the CC allows ranges of block-level addressing to be specified to detect possible overlaps in multi-block operations.

FIG. 1 illustrates an example computing environment 100 that includes a memory subsystem 110 in accordance with some embodiments of the present disclosure. The memory subsystem 110 can include media, such as memory components 112A to 112N. The memory components 112A to 112N can be volatile memory components, non-volatile memory components, or a combination of such. In some embodiments, the memory subsystem is a storage system. An example of a storage system is an SSD. In some embodiments, the memory subsystem 110 is a hybrid memory/storage subsystem. In general, the computing environment 100 can include a host system 120 that uses the memory subsystem 110. For example, the host system 120 can write data to the memory subsystem 110 and read data from the memory subsystem 110.

The host system 120 can be a computing device such as a desktop computer, laptop computer, network server, mobile device, or such computing device that includes a memory and a processing device. The host system 120 can include or be coupled to the memory subsystem 110 so that the host system 120 can read data from or write data to the memory subsystem 110. The host system 120 can be coupled to the memory subsystem 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory subsystem 110. The host system 120 can further utilize an NVM Express (NVMe) interface to access the memory components 112A to 112N when the memory subsystem 110 is coupled with the host system 120 by the PCIe interface. The physical host interface can provide an interface for passing control, address, data, and other signals between the memory subsystem 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and an MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 120. In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the controller 115, in another embodiment of the present disclosure, a memory subsystem 110 may not include a controller 115, and may instead rely upon external control (e.g., provided by an external host, or by a processor or controller separate from the memory subsystem).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

The memory subsystem 110 includes a coherency checker ("CC") 113 that can be used to detect collisions between operations (e.g., operations that target the same memory address and overlap during some portion of the processing of the operations). In some embodiments, the controller 115 includes at least a portion of the CC 113. For example, the controller 115 can include a processor 117 (processing device) configured to execute instructions stored in local memory 119 for performing the operations described herein. As another example, the CC 113 can be a hardware component that includes a memory mapped interface through which the processor 117 can issue commands and retrieve results. In some embodiments, the CC 113 is part of the host system 120, an application, or an operating system.

An objective of the CC 113 is to detect overlaps between a current request and one or more previous requests present in a coherency cache 123. To avoid blocking operations, the CC 113 uses the coherency cache 123 to track in-flight write operations (e.g., those operations that have data that has not been written to media 112) for comparison against subsequent read or write operations. Thus, when a write operation is delayed and there is a subsequent, colliding read operation, the CC 113 acts to "serialize" requests by using the in-flight data associated with the write operation rather than waiting for the data to be written to the media 112. For example, a write operation can be queued for a period of time during which other write data is aggregated (e.g., to write a large amount of data to the media 112). In that same period of time, a read operation can be issued that targets the same address as the write operation. Rather than block the read operation until the write operation has completed, the CC 113 facilitates the fulfillment of data for the read operation by detecting the collision with the write operation and causing the requested data to be fetched from a write buffer associated with the write operation. An exemplary coherency cache 123 is provided below with reference to FIG. 3.

In some embodiments, the CC 113 uses several data structures either directly or indirectly in addition to the coherency cache 123, including buffers 121, system tag frames 125, and locks 127. Each of these data structures can be stored in the local memory 119. Note that the local memory 119 can be a combination of one or more memories, such as local static random-access memory (SRAM) embedded within the controller 115 or DRAM attached to the controller 115. In some embodiments, the coherency cache 123 is stored in SRAM and the buffers 121, system tag frames 125, and locks 127 are stored in SRAM.

A system tag, or SYSTAG, is an identifier that the memory subsystem assigns and uses to track operations—whether originating from the host system 120 or process or component of the controller 115 (e.g., garbage collection)—directed to the memory components 112. SYSTAG identifiers identify SYSTAG frames 125. In some embodiments, the SYSTAG identifier is a memory address of the allocated SYSTAG frame. A SYSTAG frame includes various information or metadata associated with the associated operation. Components of the memory subsystem 110 use the data contained within a system tag frame to coordinate processing of operations. Such components can include hardware components of the controller 115 or software components executing on different cores of the processor 117. For example, a controller 115 can include a front-end process that interacts with the host system, a translation process that, amongst other things, coordinates various processes, including the front-end process and a garbage collection process, that operate in a logical address space, and a backend process that receives operations translated into a physical address space from the translation process and carries out those operations on media 112. Amongst other things, a SYSTAG frame includes information identifying one or more buffers in buffers 121 for storing the actual data associated with read and write operations.

Both SYSTAG frames and buffers are dynamic resources that are allocated and deallocated as part of processing an operation. To facilitate the non-blocking of operations in situations in which commands collide, the CC 113 leverages a locking mechanism on these dynamic resources to ensure they are not deallocated after completion of an associated operation when the fulfillment of another operation is still contingent on their contents. For example, a non-zero counter associated with a SYSTAG or buffer can indicate that there is some pending operation that is dependent on the resource. In one embodiment, each dynamic resource (e.g., SYSTAG frames and buffers) can have an associated counter whose value indicates the number of operations that are dependent on that resource. The counter can be located based on the identifier associated with the resource (e.g., a SYSTAG identifier, a buffer identifier or address, etc.). The value of the counter can indicate the number of outstanding operations that depend on the associated resource.

As an example of a counter-based locking mechanism, a write command can be received from the host system 120. The controller 115 (e.g., a host command process executed by the processor 117) allocates a SYSTAG frame and a buffer in which to store the data to be written to the media 112. Upon allocation, the controller 115 increments the value of counters for the SYSTAG frame and the buffer to '1' to indicate the one outstanding operation associated with those resources (the write operation). Prior to writing the data to memory, a read command can be received from the host system directed to the same address as the write command. The controller allocates a SYSTAG frame and the CC 113 determines there is a collision with the write operation. The CC 113 increments the counters for the SYSTAG frame and the buffer associated with the write operation from '1' to '2.' By doing so, even if the write operation completes and attempts to deallocate the resources, the counters associated with the resources will be decremented from '2' to '1' but not released until such a time that the read operation completes and deallocates (e.g., decrements) the resources.

Figure 6:
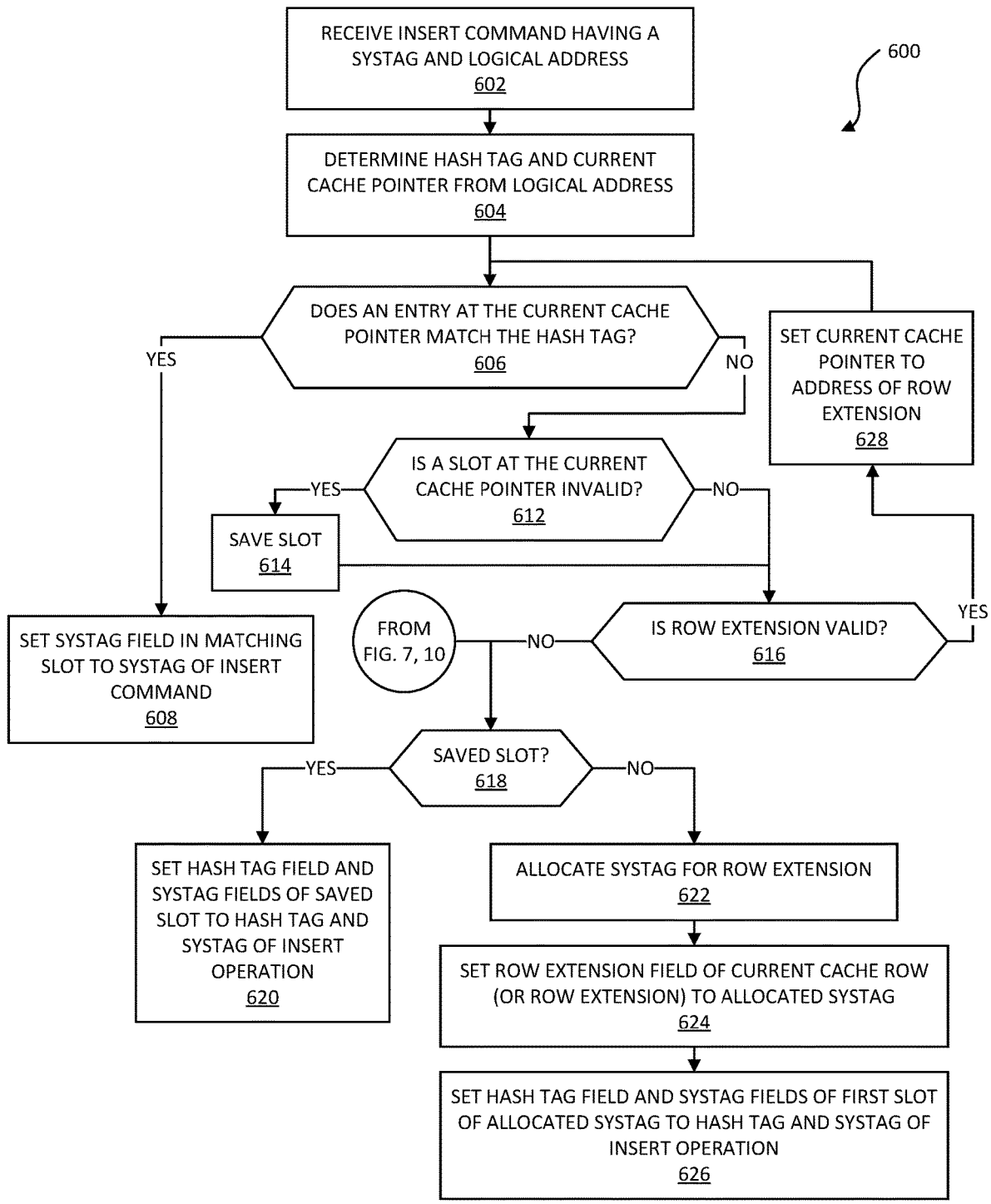
FIG. 6 is a flow diagram of an example method to insert an entry into cache in accordance with some embodiments of the present disclosure.
Figure 7:
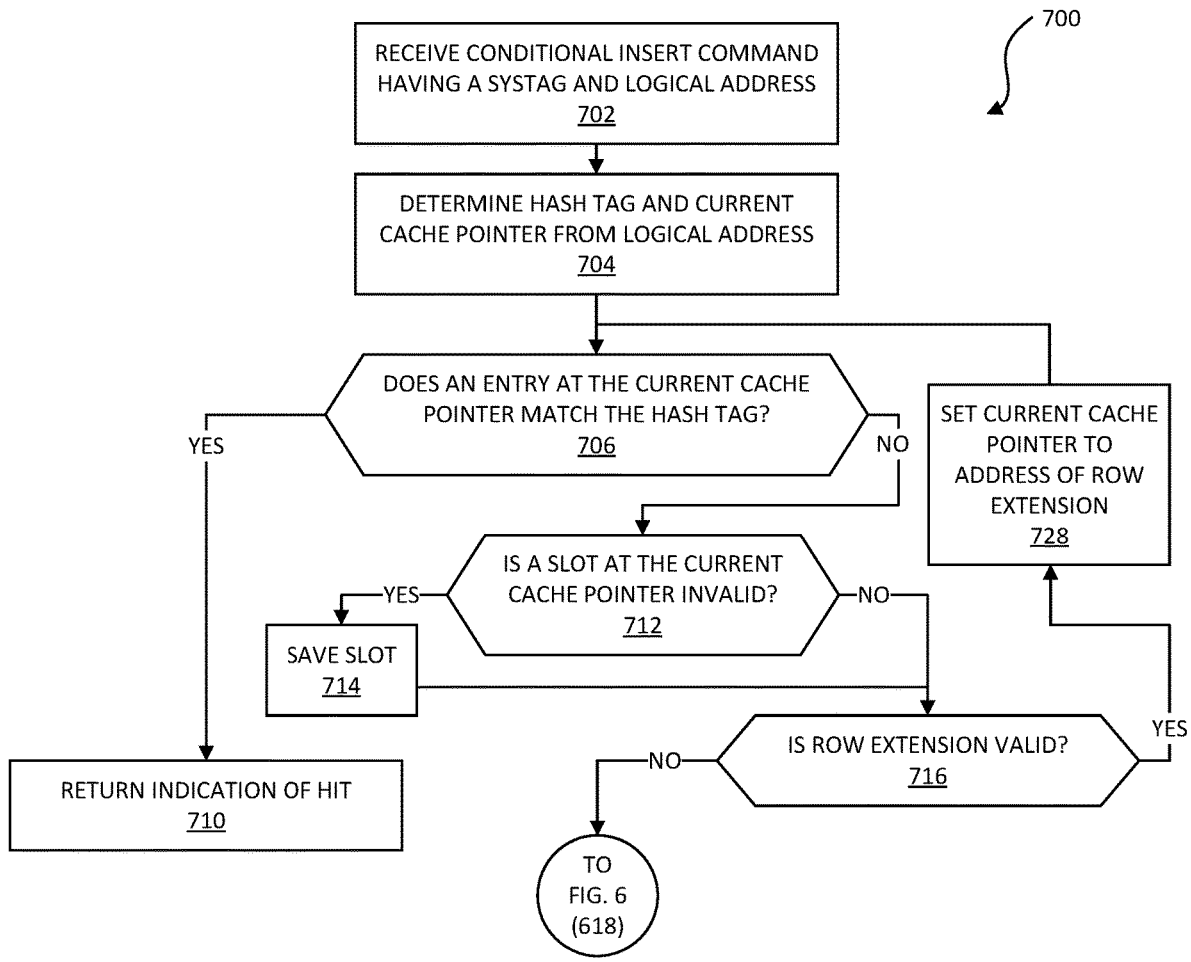
FIG. 7 is a flow diagram of an example method to conditionally insert an entry into cache in accordance with some embodiments of the present disclosure.
Figure 8:
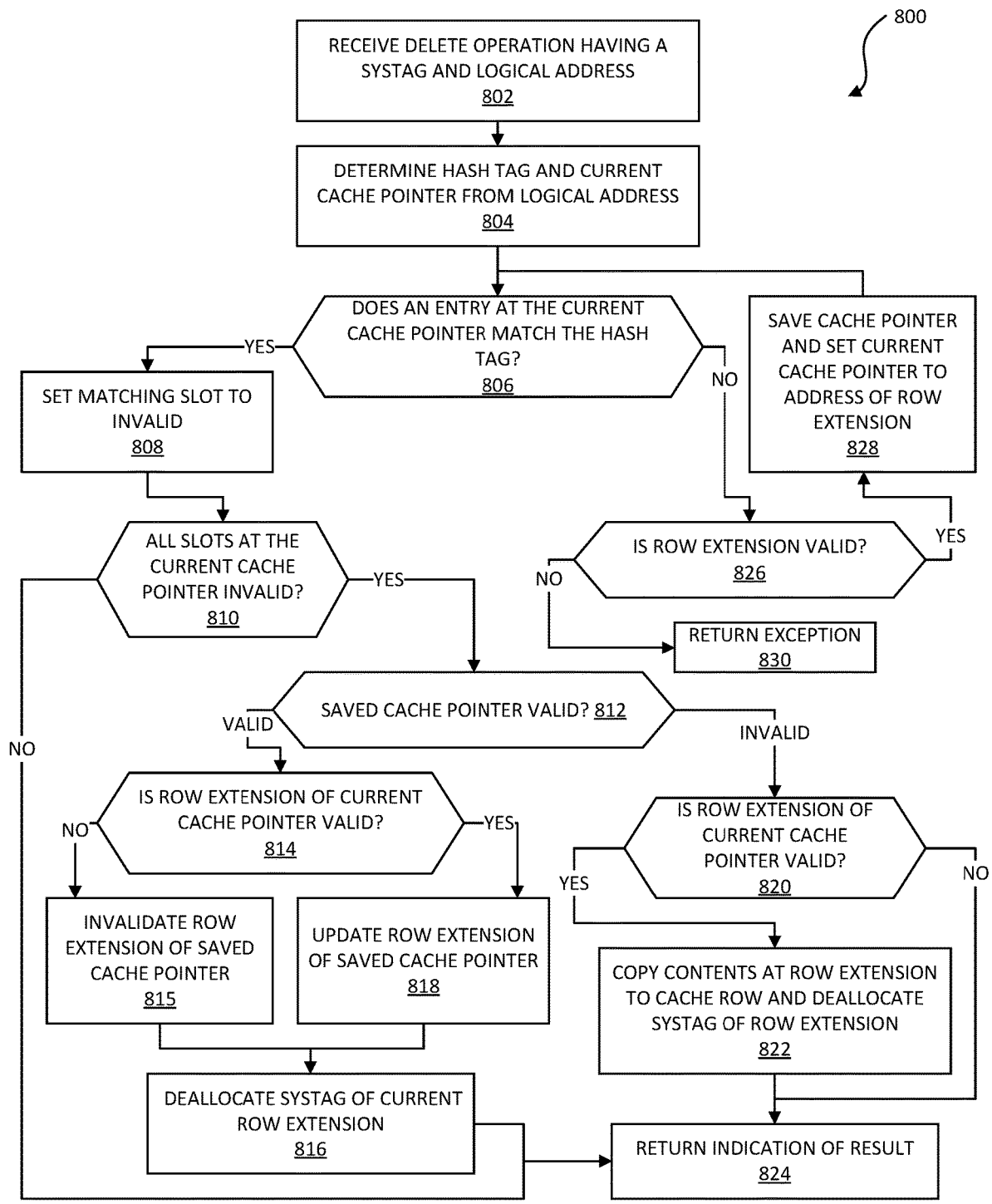
FIG. 8 is a flow diagram of an example method to delete an entry from cache in accordance with some embodiments of the present disclosure.
Figure 9:
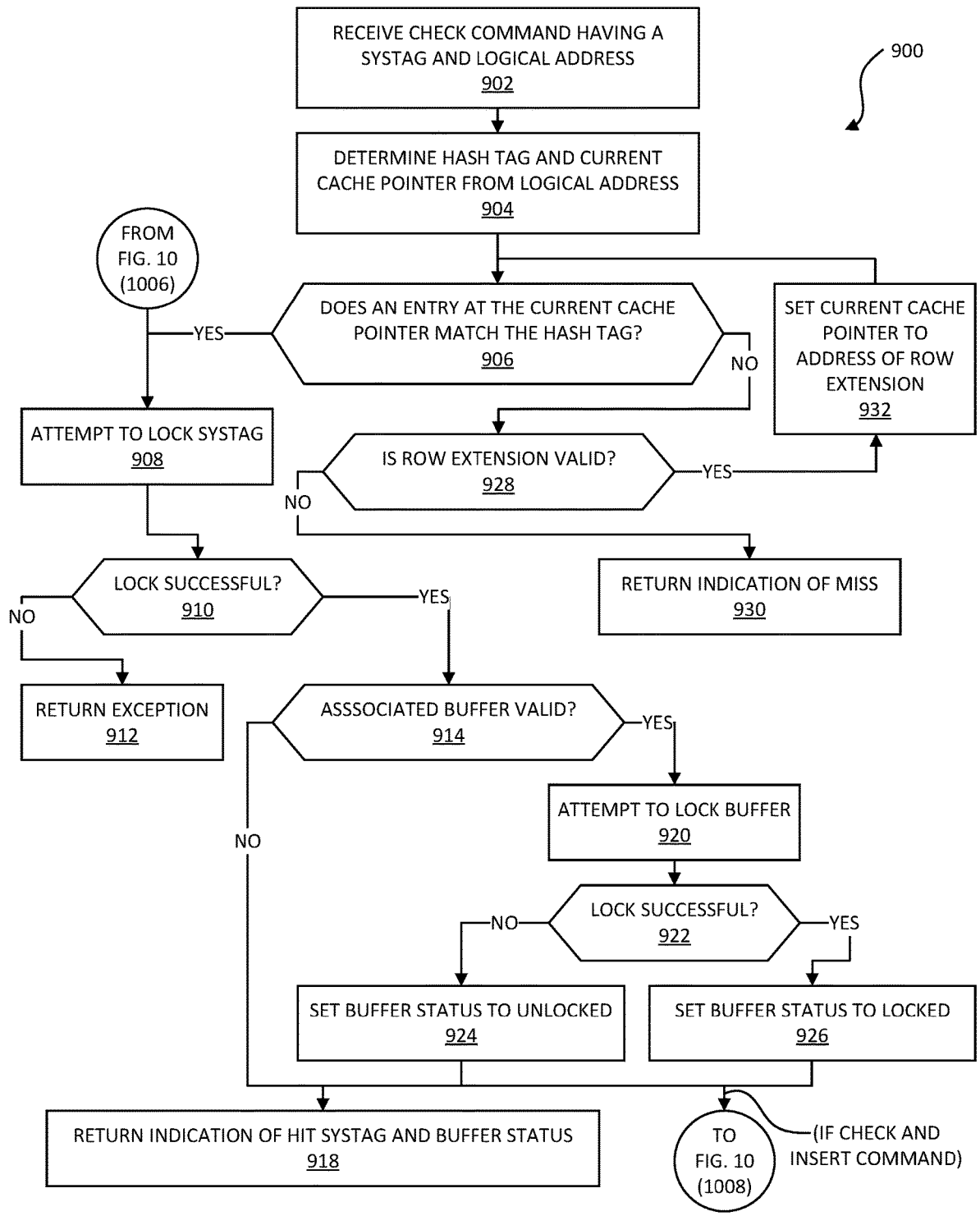
FIG. 9 is a flow diagram of an example method to check whether an entry exists in cache in accordance with some embodiments of the present disclosure.
Figure 10:
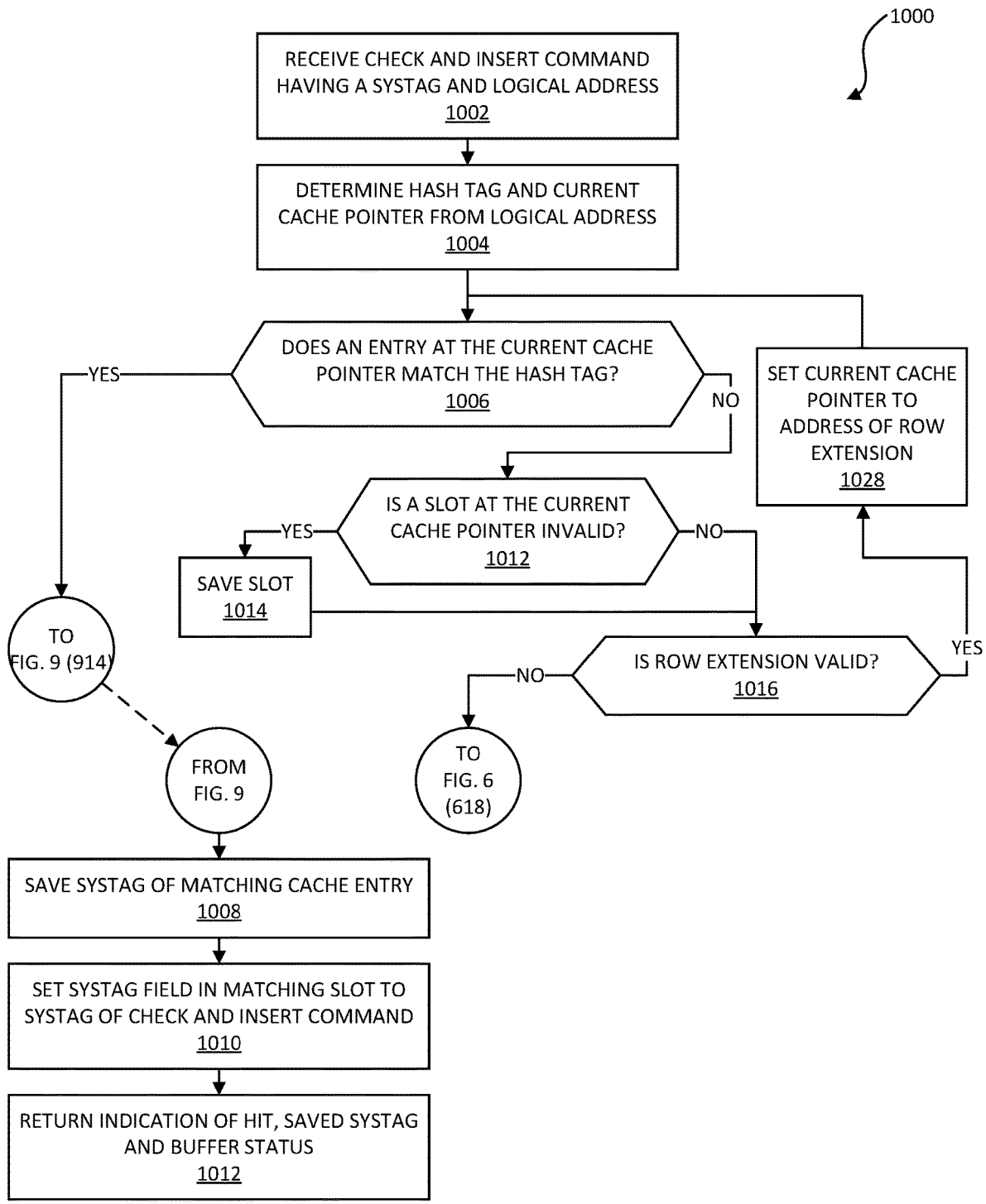
FIG. 10 is a flow diagram of an example method to check whether an entry exists in cache and, if so, insert an entry into cache in accordance with some embodiments of the present disclosure.
Figure 11:
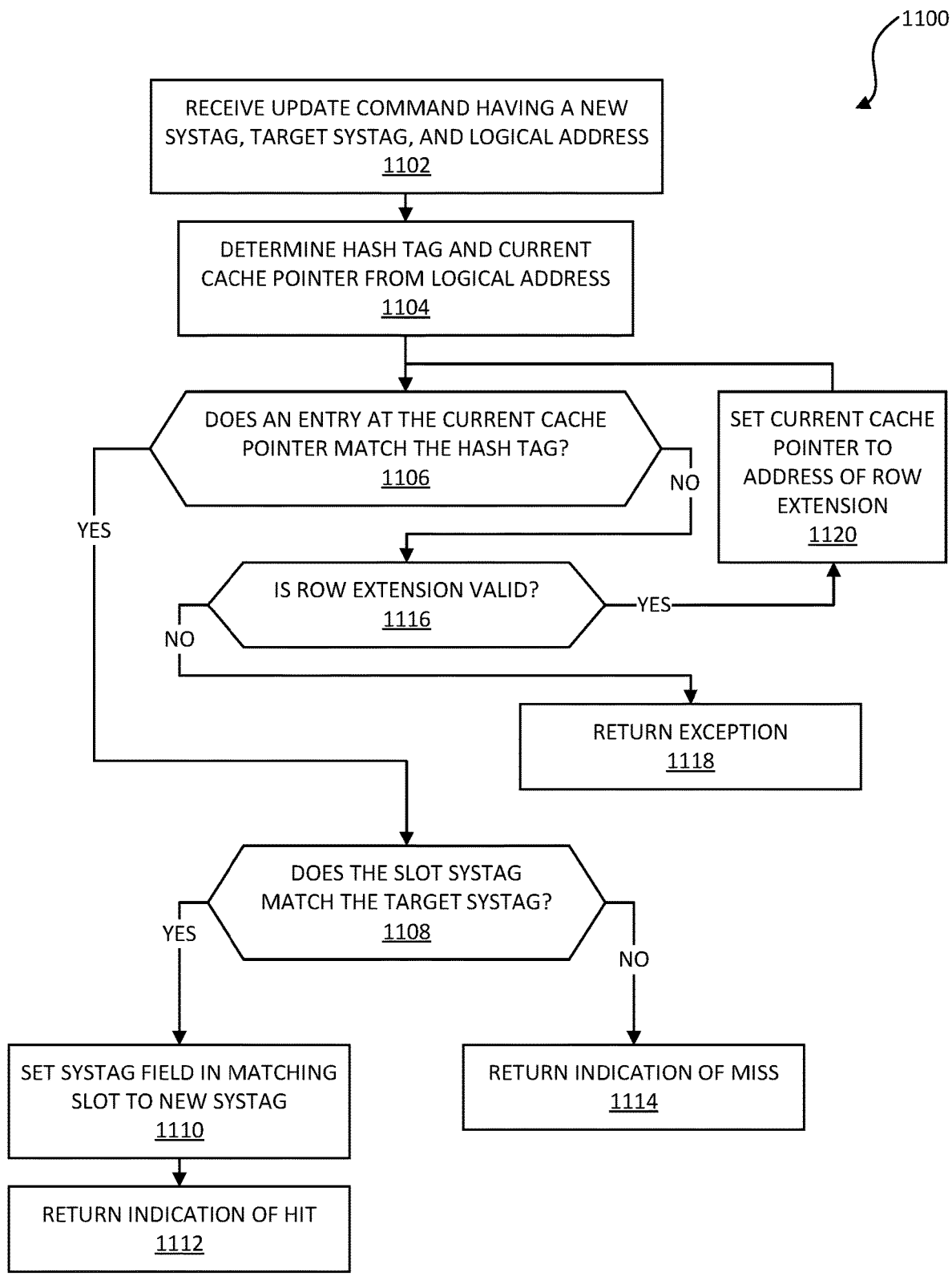
FIG. 11 is a flow diagram of an example method to update an entry in cache in accordance with some embodiments of the present disclosure.

To facilitate the detection and management of collisions, the CC 113 provides an interface through which other components of the memory subsystem 110 interact with the coherency cache 123. Exemplary components include hardware components and software processes executed on the processor 117, such as a process that handles commands from the host system 120 or a process that handles garbage collection. Exemplary interactions can include inserting entries into the coherency cache 123 (e.g., as shown in FIG. 6), conditionally inserting entries into the coherency cache 123 (e.g., as shown in FIG. 7), deleting entries from the coherency cache 123 (e.g., as shown in FIG. 8), checking for entries in the coherency cache 123 (e.g., as shown in FIG. 9), checking for and inserting entries in the coherency cache 123 (e.g., as shown in FIG. 10), and updating entries in the coherency cache 123 (e.g., as shown in FIG. 11).

Further details with regards to the interactions with and operations of the CC 113 are described below.

FIG. 2 illustrates an example system tag frame 200 in accordance with some embodiments of the present disclosure. A system tag frame 200 is allocated in memory for each operation, including those originating from the host and those originating internally within the memory subsystem. As described above, a SYSTAG identifier, or pointer to or address of the system tag frame 200 for a given operation, can be used to uniquely identify the operation and track its progression during processing. The illustrated exemplary SYSTAG frame 200 includes a buffer identifier ("BI") field 205, a next SYSTAG identifier field 210, a length field 215, a BI extension field 220, a logical address ("LA") field 225, a pending SYSTAG identifier field 230, a host identifier field 235, a LA extension field 240, a reserved area 245, and a bitmap field 250.

In some embodiments, buffers can be fixed size allocations of memory (e.g., 4 kilobytes ("KB")) or vary in size. In this example, the BI field 205 can includes pointers to one or more buffers in memory allocated for storing data to be written to the media 112 or for data to be read from the media 112. The BI extension field 220 can include upper address bits associated with a pointer to a buffer (e.g., when a buffer is located within an upper region of memory). The length field 215 can be used to specify the amount of data stored in the buffer in cases where the buffer is not a fixed size. The next SYSTAG identifier field 210 can be used to chain a sequence of SYSTAGs together. The pending SYSTAG identifier field 230 can be used to associate the SYSTAG of another operation with the current SYSTAG. The host identifier field 235 can be used to identify commands from the host system 120 (as opposed to commands that originate within the memory subsystem 110), for example, when pending commands from the host system 120 are assigned unique identifiers. The LA field 225 can include the logical address associated with the SYSTAG operation (e.g., the address to which to write data or from which to read data). Note that the logical address can be indirectly associated with the actual physical address on the media 112 where the data is stored and translated using logical-to-physical address tables. The LA extension field 240 can include, if necessary, upper address bits associated with the logical address (e.g., for large-sized media that require additional bits in addressing). The bitmap field 250 can be used to track data that is less than the block size of the media. For example, if data is written to and read from the media in 4 kilobyte blocks, the bitmap field can be used to track 512-byte chunks of the block. The reserved area 245 can be used for other operations outside of the scope of this disclosure.

In one embodiment, SYSTAG frames are stored in DRAM and sized for access within a single clock cycle of the DRAM interface. For example, the SYSTAG frame can be 160 bits for storage in a DRAM with a 160-*bit* interface.

The CC 113 can use SYSTAGs to locate metadata about an operation (e.g., the LA field 225) during coherency checking operations and as a resource to expand the size of the coherency cache 123. The usage of SYSTAGs to expand the size of the coherency cache 123 allows the CC 113 to handle an arbitrary number of collisions without imposing the cost and complexity associated with including spare cache space in the coherency cache 123 which can go unused depending on the number of in-flight collisions that occur. Further, by re-using SYSTAG structures to expand the size of the coherency cache 123 in addition to as a data structure for tracking operations, the memory subsystem 110 can reduce the number of memory resources to be managed.

The validity of a field in the SYSTAG frame can be encoded within the field using one or more bits of the field. For example, a bit of a field can be used to indicate whether the field is invalid, setting each of the bits to '1' can indicate the field is invalid, etc.

Figure 3A:
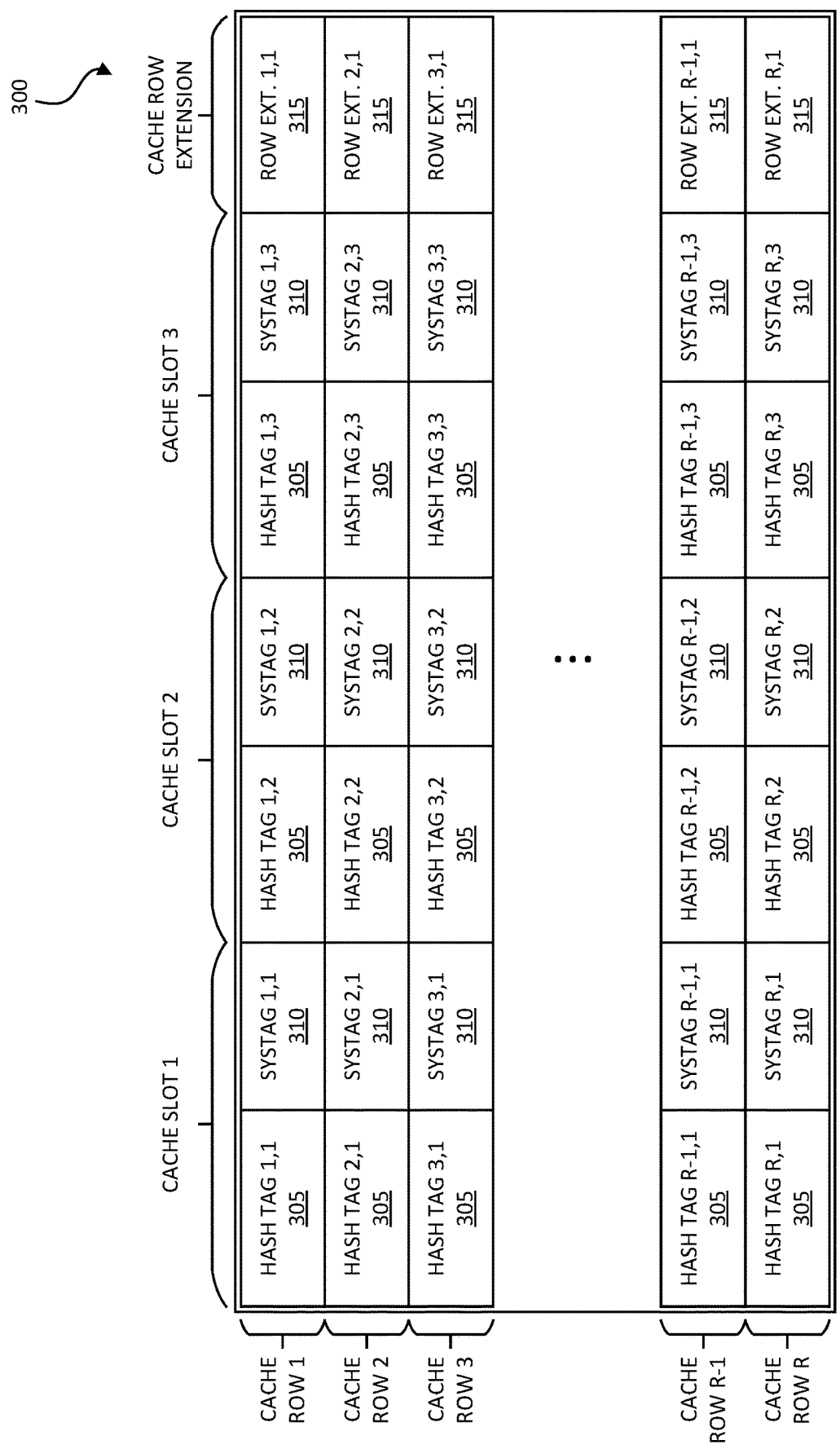
FIG. 3A illustrates an example cache structure in accordance with some embodiments of the present disclosure.

FIG. 3A illustrates an example cache structure 300 of the coherency cache 123 in accordance with some embodiments of the present disclosure. In the illustrated example, the cache structure 300 is a three-way associative cache having R rows, each row containing three slots. The three-way structure allows the CC 113 to handle up to three collisions without penalty. Other cache structures can be used.

Each cache slot includes two fields, a hash tag field 305 and a SYSTAG field 310. The SYSTAG field 310 stores a SYSTAG identifier (e.g., the address of the SYSTAG frame associated with an in-process operation), and the hash tag field 305 stores a hash value of a logical address to identify which of many possible memory locations that use a given cache row is contained within the slot (if any). The labeling notation of the hash tag and SYSTAG fields refers to the cache slot and row of the entry in the cache structure 300 (e.g., hash tag 1,1 refers to the hash tag field 305 in the first row of the first slot; SYSTAG R-1,3 refers to the hash tag field 305 in the R-1 row of the third slot).

In some embodiments, the CC 113 can use a row extension as described in further detail below with reference to FIG. 3B to handle more than three collisions. Each row includes a row extension field 315. The labeling notation of the row extension field refers to the row and extension number (e.g., row extension 3,1 refers to the first row extension of the third row).

The number of rows, R, of the cache can be optimized based on the number of in-flight operations that can exist (e.g., due to design constraints on the memory subsystem 110) and the associativity of the cache. In some embodiments, the number of in-flight operations divided by the number of slots in the cache structure (e.g., the hash load) is kept at or around 0.5 for performance. Thus, if the memory subsystem 110 allowed for 7,500 pending operations, the number of slots can be ~15,000, which, in a 3-way associative cache, is 5,000 rows.

Functions can be used to calculate the row which would include a colliding entry, if any, and the hash tag that identifies which of many possible memory locations that use a given cache row is contained within the slot. The functions can compute the row and hash tag based on the logical address associated with a SYSTAG. Each time that logical address is used in a command, the CC 113 checks the row associated with that logical address. In an exemplary embodiment, the modulo function can be used to calculate a hash row from the logical address (e.g., logical address % R) and a bit-shift function can be used to calculate the hash tag (e.g., logical address >>log 2R). One advantage of using the modulo function in assigning rows is that sequential logical addresses hash to sequential rows, which reduces the number of accesses to the coherency cache 123 when handling a range of logical addresses, particularly if the coherency cache 123 is stored in a burstable memory such as some DRAM. Further, when handling a range of logical addresses, the modulo function can be calculated one time (for the lead logical address) and incremented for each subsequent address rather than computing a more complicated hash function for each logical address in the range.

Figure 3B:
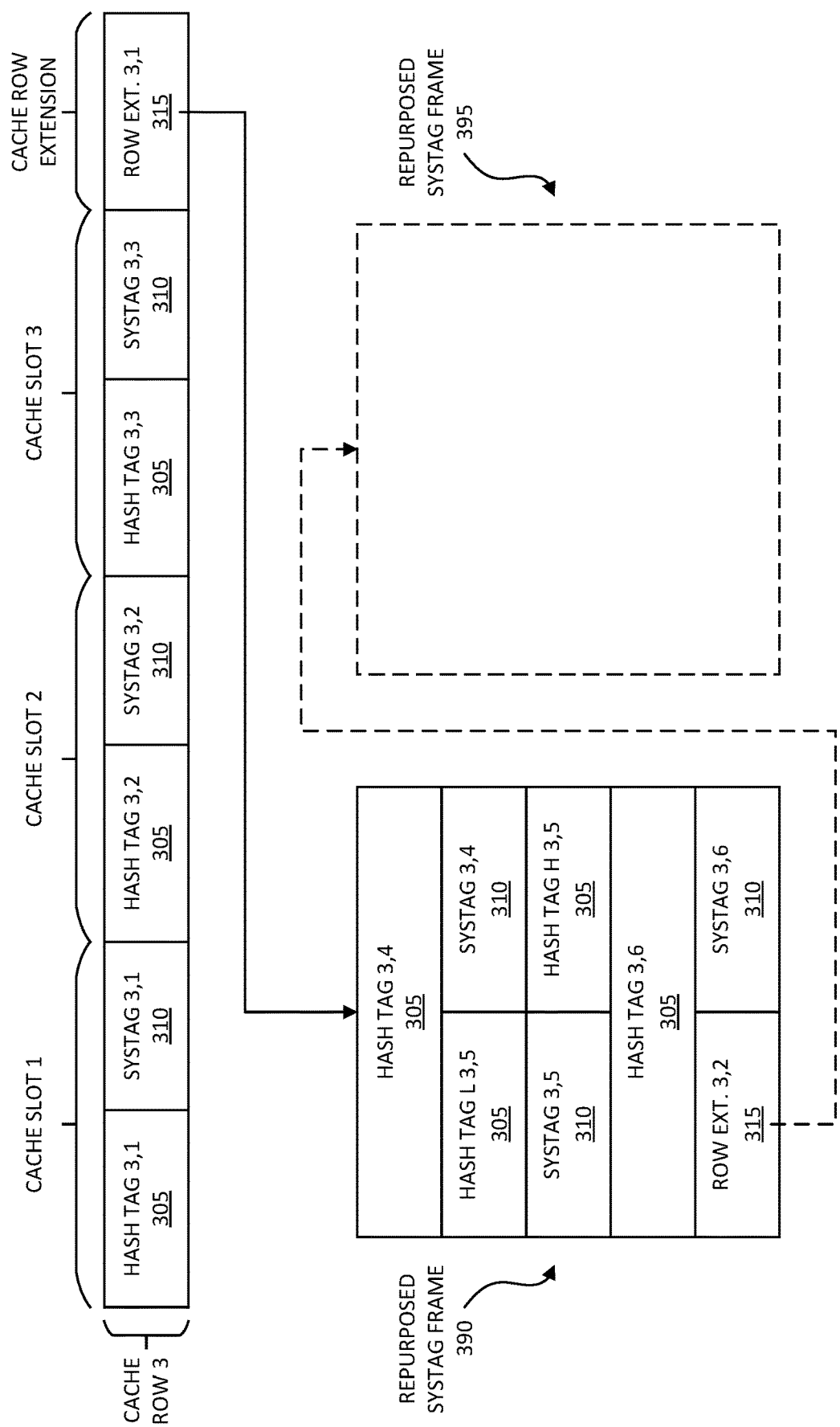
FIG. 3B illustrates an example cache row extension of the example cache structure of FIG. 3A in accordance with some embodiments of the present disclosure.

FIG. 3B illustrates an example cache row extension of the example cache structure of FIG. 3A in accordance with some embodiments of the present disclosure. As indicated above, the 3-way associative cache allows for up to three collisions within a group of addresses that hash to a particular row without penalty. To avoid operation blocking when greater than three collisions within a group of addresses occur, the row can be extended as shown using the row extension field 315. The row extension field can be used to identify additional slots in memory, such as through the use of repurposed SYSTAG frames that are allocated by the same memory management process that provides the memory subsystem with SYSTAG frames for operations but re-used to track collisions, thereby avoiding the need to introduce another memory management process or modify an existing memory management process. The value in the row extension field 315 can be encoded to indicate whether there is a row extension (e.g., whether cache row 3 points to a row extension in the repurposed SYSTAG frame 390, whether the repurposed SYSTAG frame 390 points to the repurposed SYSTAG frame 395, etc.) In some embodiments, the memory footprint of a SYSTAG frame allows for the inclusion of multiple additional slots and another row extension field to point to another extension, if needed. As shown, the repurposed SYSTAG frame includes three additional slots. The first row extension field 315 of row 3 points to a repurposed SYSTAG frame 390 that includes slots 4, 5, and 6 and a second row extension field 315 that points to a repurposed SYSTAG frame 395. Note that hash tag 305 for the fifth slot is split between rows ('L' and 'H') in this illustration to mirror the format of the SYSTAG frame illustrated in FIG. 2. Since a repurposed SYSTAG frame includes three slots, the number of memory accesses to check for collisions increases by one for each additional three pending operation collisions, assuming each of the slots within the repurposed SYSTAG frame(s) are valid (e.g., one memory access to the coherency cache 123 for up to three collisions, one additional memory access to fetch the repurposed SYSTAG frame for up to six collisions, etc.).

The CC 113 calculates rows and hash tags from the logical address associated with an operation. For example, in the case of a non-colliding write operation, the CC 113 receives a logical address and a SYSTAG, calculates the value of the hash tag and determines which cache row of the cache structure to use based on the logical address, and inserts the value of the hash tag and the SYSTAG identifier into the respective fields 305, 310 of an available slot in the row. In some embodiments, the CC 113 can receive a range of logical addresses and corresponding list of SYSTAGs to be inserted into the cache structure. If the row of a cache structure is full, the CC 113 can employ the row extension field to expand the row. As the row and row extensions fill, the CC 113 can chain row extensions together as needed. In the case of a read operation, the CC receives a logical address or a range of logical addresses and responds with a list of SYSTAGs that were hit. The CC 113 can calculate the row and hash tag for each of the logical addresses within the range to locate hits within the cache structure. In embodiments in which the modulo function is used to calculate the row, the calculation can be performed once for the lead logical address and the result incremented for each consecutive logical address. If valid row extensions are present on a row, the CC 113 evaluates the row and iterates through the row extensions to find a hit.

In some embodiments, the CC 113 locks hit SYSTAG frames and, if present, the associated buffer. For example, if a count is used to represent the number of outstanding operations that are associated with a SYSTAG, the CC 113 can atomically increment the counts associated with the SYSTAG and the buffer to reflect the dependency imposed by the later operation (e.g., a read operation that collided with a write operation identified in the cache structure). In some embodiments, locking is achieved by using a one-byte count per SYSTAG and per buffer. When a SYSTAG is allocated, the count is set to 1. Similarly, when a buffer is allocated, the count is set to 1. Each time a later operation hits/depends on the SYSTAG and/or buffer causes the count to be incremented. And each time an operation attempts to deallocate the SYSTAG and/or buffer, the count is decremented until it reaches zero, at which point it can be released.

In some embodiments, the CC 113 maintains a stash of pre-allocated SYSTAGs for use as row extensions to avoid delays associated with allocation after a collision occurs.

The validity of entries in slots of the cache data can be encoded within the hash tag field and/or SYSTAG field of a slot using one or more bits of the field. For example, a bit of a field can be used to indicate whether the field is invalid, setting each of the bits to '1' can indicate the field is invalid, etc.

Figure 4A:
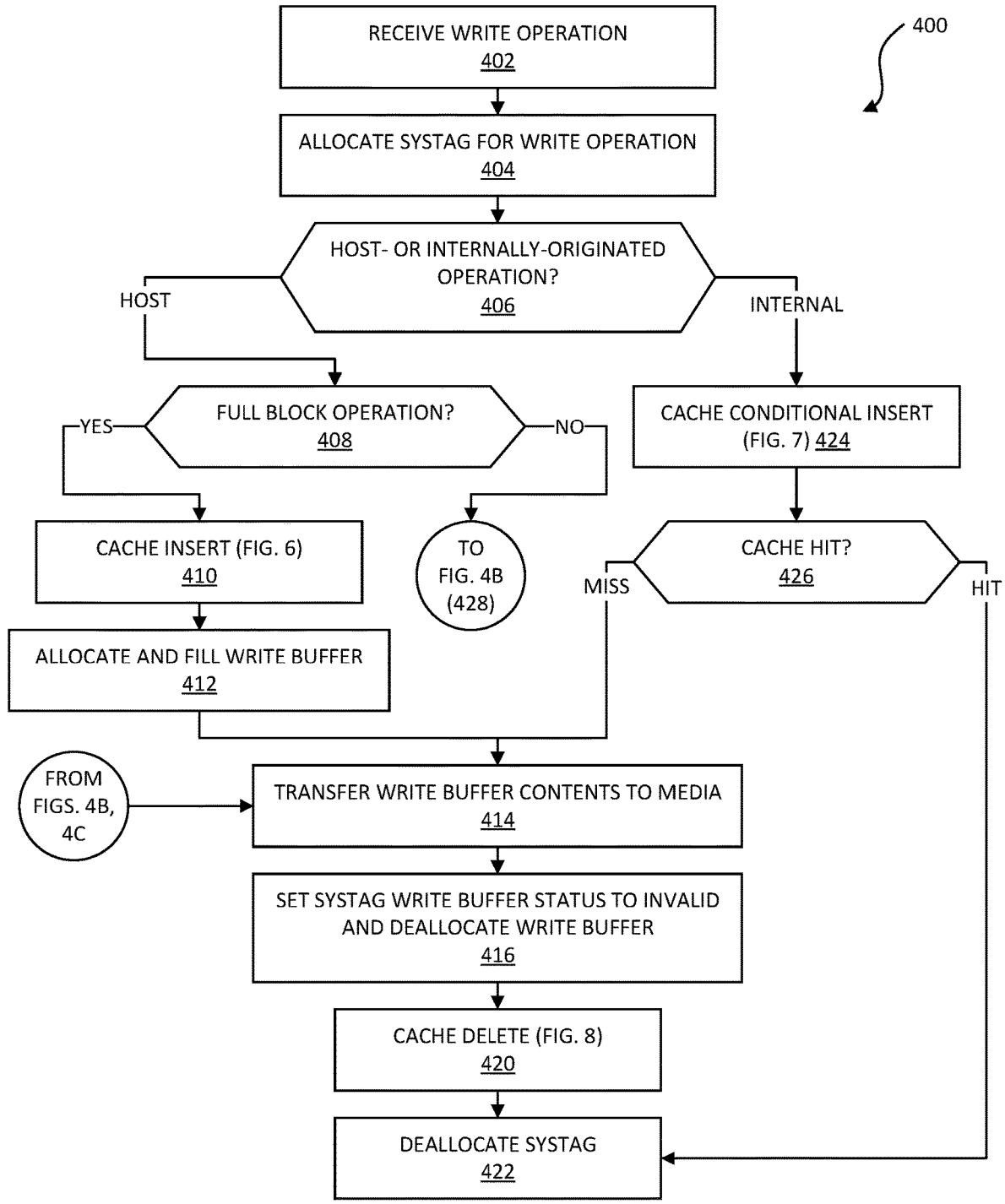
FIGS. 4A-4C illustrate a flow diagram of an example method to process write operations in accordance with some embodiments of the present disclosure.
Figure 4B:
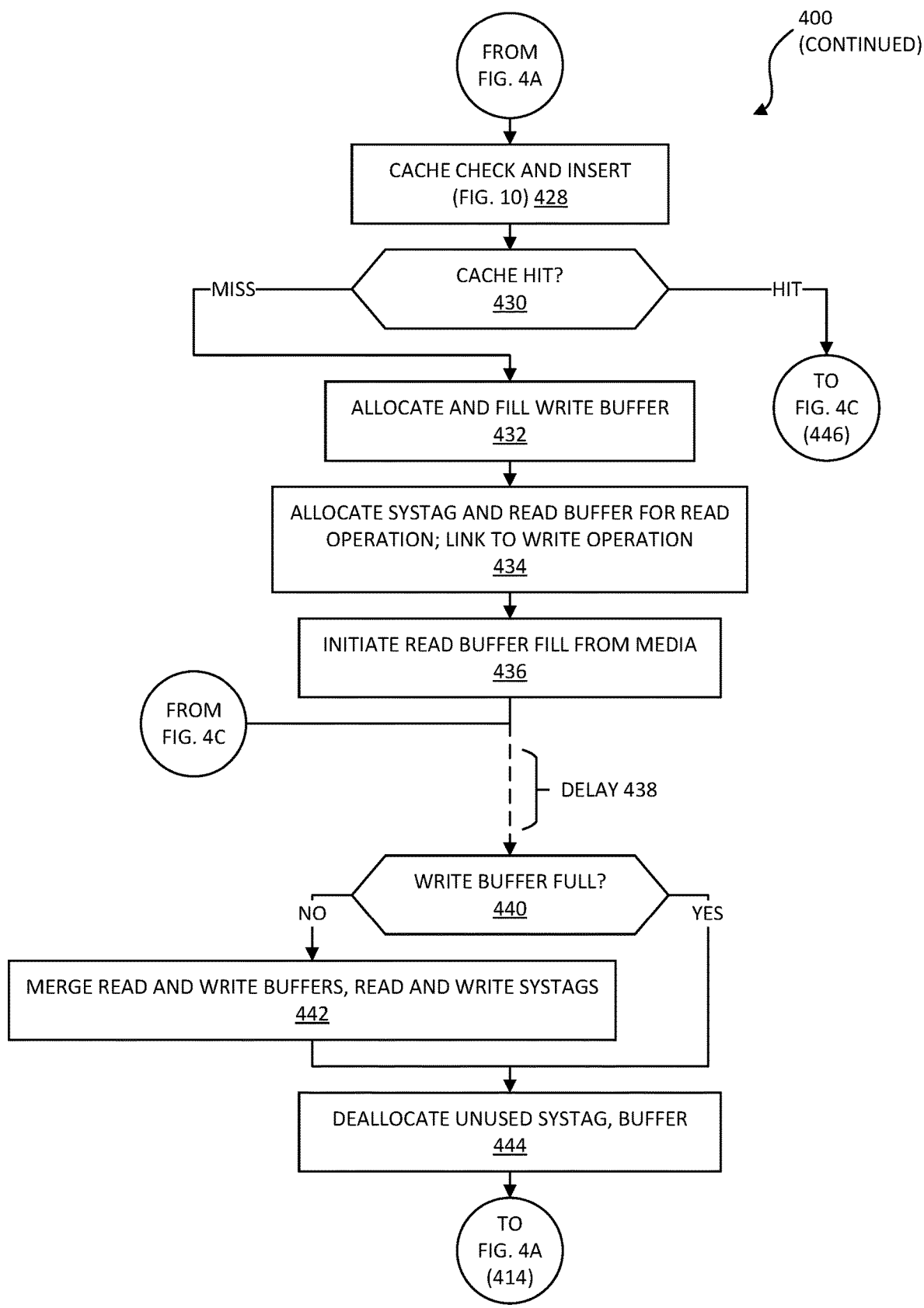
Figure 4C:
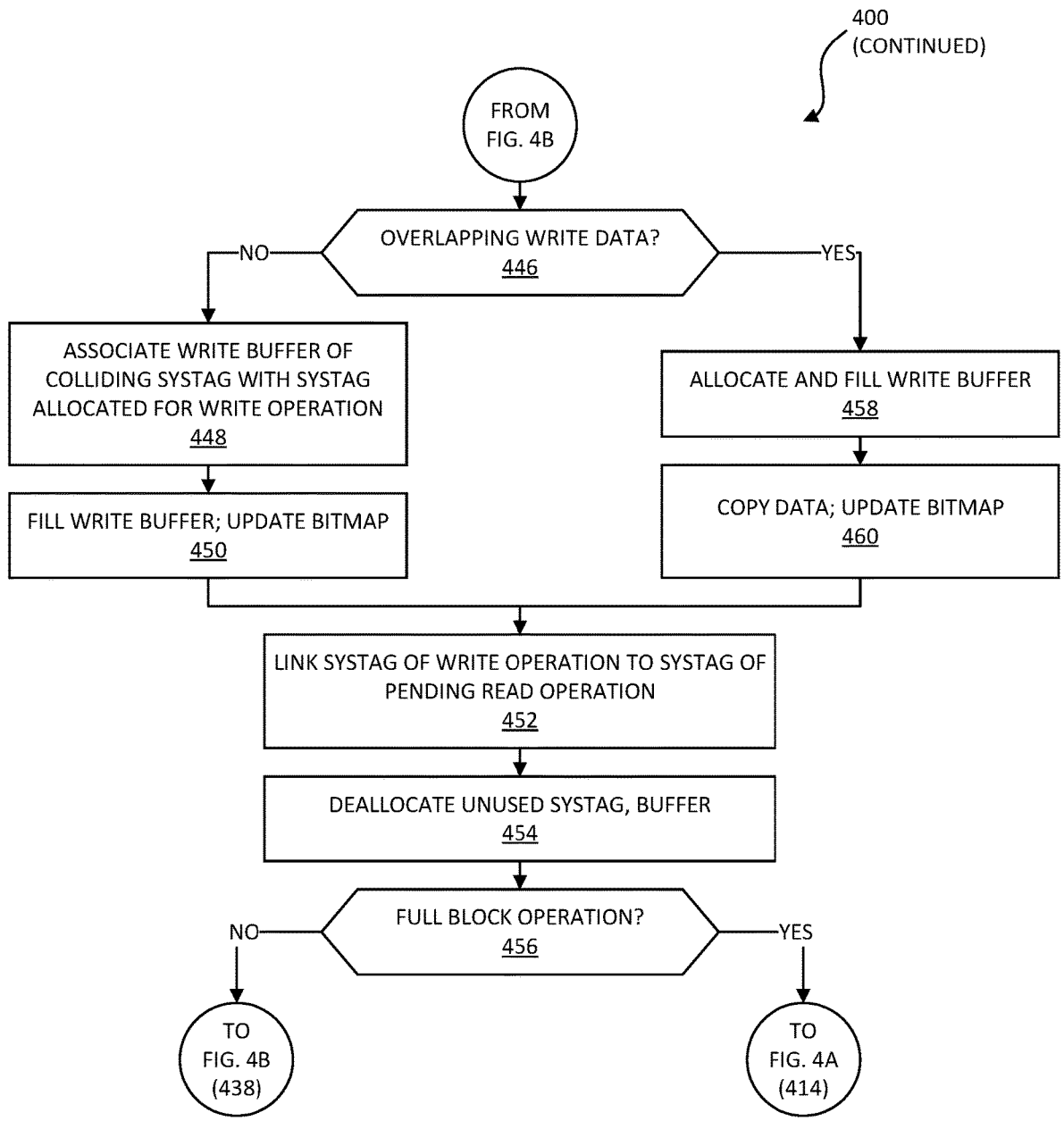
Figure 5:
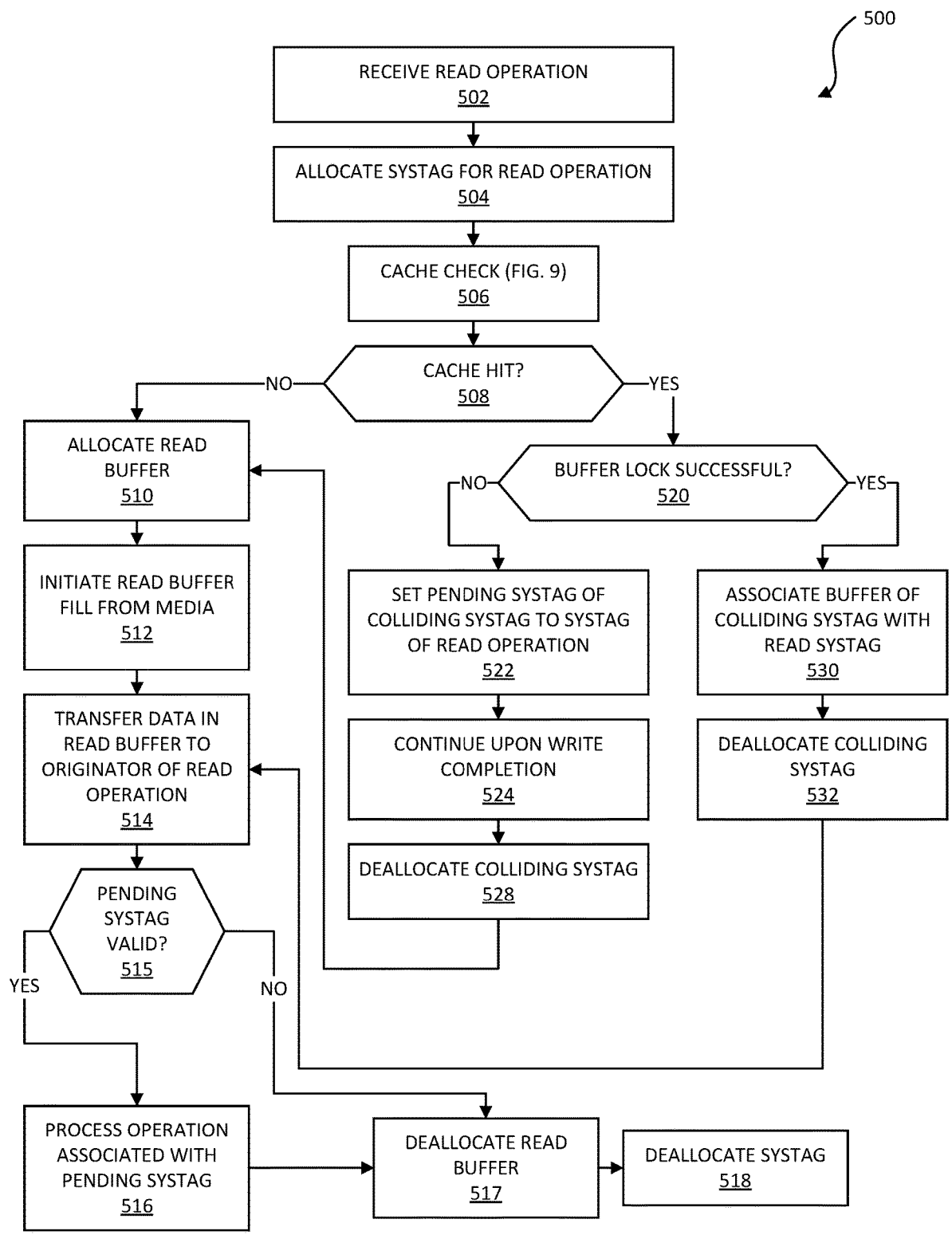
FIG. 5 is a flow diagram of an example method to process read operations in accordance with some embodiments of the present disclosure.

FIGS. 4A-4C illustrate a flow diagram of an example method 400 to process write operations in accordance with some embodiments of the present disclosure. FIG. 5 is a flow diagram of an example method 500 to process read operations in accordance with some embodiments of the present disclosure. The methods 400, 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods 400, 500 are performed by the processor 117 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

With reference to FIG. 4A for write operations, at operation 402, the processing device receives a write operation. For example, the host system 120 or an internal media management process of the memory subsystem 110 can issue a write command that identifies data to be written to the media. At operation 404, the processing device allocates a SYSTAG frame for the write operation. As indicated above, SYSTAG frames are used to track metadata associated with an operation as the operation is carried out by various processing stages or components of the memory subsystem 110. If the write operation is less than a full block operation, the processing device can use the bitmap field 250 in the allocated SYSTAG frame to indicate which sub-blocks are being written. For example, if the media block size is 4 KB and the sub-block write is to the last 512 bytes in the block, the processing device can represent the sub-block operation with a value of 0x01 in the bit map field 250.

At operation 406, the processing device checks whether the received write operation originated from a host or internally from the memory subsystem. The origin of a write operation can influence how to handle the operation if it collides with an earlier-issued, in-flight write operation. For example, it is preferable for the later of two colliding host write operations to supersede the earlier write operation to reduce the number of writes performed on the media 112. In contrast, if the later of two colliding write operations is issued by a garbage collection process while the earlier write operation was issued from the host system 120, the garbage collection process could be attempting to re-write stale data that was superseded by the earlier host write operation. If the processing device determines that the write operation originated from a host, the method 400 continues to operation 408. If the processing device determines that the write operation originated from another internal process or component of the memory subsystem 110, the method 400 continues to operation 424.

At operation 408, the processing device checks whether the write operation is a full block operation. For example, if the underlying media format has a 4 KB block size and the write operation is of 512 bytes, the write operation is not a full block operation. If the processing device determines that the write operation is a full block operation, the method 400 continues to operation 410. If the processing device determines that the write operation is not a full block operation, the method 400 continues to operation 428 (in FIG. 4B).

At operation 410, the processing device causes an entry associated with the write operation to be inserted into the cache. For example, the processing device can instruct the CC 113 to insert an entry into the coherency cache 123 associated with the write operation. Further details on the cache insert operation are provided below with reference to FIG. 6.

At operation 412, the processing device allocates and fills a write buffer with the data identified with the write operation. For example, in some embodiments, a write operation received from the host system 120 at operation 402 can include an address in host memory that contains the data to be written. As part of a host write operation, the processing device allocates a buffer and transfers the write data from the host memory to the buffer (e.g., in local memory 119). In other embodiments, the processing device can receive and buffer the write data upon or as part of receipt of the write operation.

At operation 414, the processing device transfers the contents of the write buffer to the media. For example, a media controller can control reads and writes to physical locations on the media 112. The processor, in conjunction with the media controller, can transfer the data to be written to the media. Note that this transfer can be to another buffer downstream of the local memory that is accessible to the media controller and not necessarily reflect an actual write to a media 112. For example, the media controller can aggregate the data of many write operations in another buffer downstream of the write buffer before writing the aggregated data to the media 112.

At operation 416, the processing device sets the write buffer status to invalid in the SYSTAG frame associated with the write operation and deallocates the write buffer. For example, the processing device can set one or more bits in the buffer identifier field 205 or buffer identifier extension field 220 to a value indicating the buffer is invalid. In some embodiments, these operations are performed by the processor 117 after transferring the contents of the write buffer. In other embodiments, these operations are performed by the media controller or a backend process associated with writing data to the media 112. In some embodiments, deallocation removes the lock associated with the write operation from the write buffer but may not free the memory space associated with the write buffer. Such may be the case if an intervening read operation was received after the entry associated with the write operation was inserted into the cache during the transfer of the data at operation 414, resulting in the processing device imposing a lock on the buffer for the read operation.

At operation 420, the processing device causes an entry associated with the write operation to be deleted from the cache. For example, the processing device can instruct the CC 113 to delete the entry in the coherency cache 123 associated with the write operation. Further details on the cache delete operation are provided below with reference to FIG. 8.

At operation 422, the processing device deallocates the SYSTAG frame associated with the write operation. In some embodiments, deallocation removes the lock associated with the write operation from the SYSTAG frame but may not free the memory space associated with the SYSTAG frame as another intervening operation may have imposed a lock on the SYSTAG frame. For example, deallocation can decrement a counter-based lock on the SYSTAG frame, but the memory allocated for the SYSTAG frame is not deallocated until the counter reaches zero.

Note that in some embodiments, the processing device delays performing the operations at operations 420 and 422 until after the programming of the media is complete as an error during programming can cause the processing device to retry the write operation using the existing SYSTAG frame metadata.

At operation 424, the processing device causes an entry associated with the internally-generated write operation to be conditionally inserted into the cache. For example, the processing device can instruct the CC 113 to conditionally insert an entry into the coherency cache 123 associated with the write operation. As explained above, some write operations originated within the memory subsystem 110 can be superseded by earlier, in-flight write operations originated from the host system 120. The conditional insert operation ensures such precedence. Further details on the cache conditional insert operation are provided below with reference to FIG. 7.

At operation 426, the processing device checks whether the result of the conditional insert operation at operation 424 was a hit or a miss. That is, whether the cache contained an entry associated with the same logical address as the write operation being conditionally inserted into the cache. If the conditional insert operation resulted in a miss, the method 400 continues to operation 414, described above. In this scenario, the write operation did not collide with another superseding in-flight operation, so operations continue as described above. While not shown, the internal process that originated the write operation can allocate and fill a write buffer with the data to be transferred to the media at operation 414. For example, a garbage collection process may have read data from the media into a buffer for re-writing to a different location on the media. If the conditional insert operation resulted in a hit, the method 400 continues to operation 422, described above. In this scenario, the write operation associated with the conditional insert was superseded by the existing in-flight write operation, so the associated SYSTAG is deallocated and the operation itself effectively ignored.

Turning to FIG. 4B, at operation 428, the processing device causes a cache check and insert operation to be performed. The check and insert operation allows the cache to be used in conjunction with sub-block writes. For example, the processing device can instruct the CC 113 to check for an entry into the coherency cache 123 associated with the write operation so that, if an existing entry is found, the sub-block write operation can be combined with the prior write operation. Further details on the cache check and insert operation are provided below with reference to FIG. 10.

At operation 430, the processing device determines whether the result of the cache check and insert operation at operation 428 was a hit or a miss. If the check and insert operation resulted in a miss, the method 400 continues to operation 432. If the check and insert operation resulted in a hit, the method 400 continues to operation 446 (in FIG. 4C).

At operation 432, the processing device allocates and fills a write buffer with the data identified with the write operation, such as was described above with reference to operation 412.

At operation 434, the processing device initiates a read operation by allocating a SYSTAG frame and read buffer, linking the read operation and the write operation. Here, since the write operation is writing less than a full block of data, the processing device initiates a read operation to obtain the current data at the associated logical address to avoid losing the data in the portions of the block that were not written as part of the sub-block write operation. Further, since completion of the write operation can be contingent on completion of the read operation, the processing device links the two SYSTAGs. For example, the processing device can set the pending SYSTAG field of the write operation to the SYSTAG of the read operation and the pending SYSTAG field of the read operation to the SYSTAG of the write operation.

At operation 436, the processing device initiates the read operation to obtain the data block containing the sub-block to be written from the media. As indicated, there may be some delay 438 while the read operation is carried out before the processing device resumes operations at operation 440. In some embodiments, the controller 115 can use the SYSTAG identifier in the pending field of the completed read operation to identify the write operation to resume processing at operation 440.

At operation 440, the processing device checks whether the write buffer associated with the write operation has filled. As indicated above, there is some delay associated with the read operation initiated at operation 436. In the intervening time period, another write operation can collide with the pending write operation and, as described below with reference to FIG. 4C, result in a write buffer that includes an entire block of data. The processing device can determine whether the write buffer has filled based on the bitmap field of the SYSTAG frame associated with the write operation. For example, a value of 0xFF in the bitmap field could indicate that each of the eight 512-byte sub-blocks in a 4 KB block have been filled. If the buffer was filled, the method 400 continues to operation 444. If the write buffer still contains less than a full block of data, the method 400 continues to operation 442.

At operation 442, the processing device merges the data contained in the read buffer (allocated at operation 434) with the data in the write buffer associated with the write operation. In some embodiments, the merger can occur by copying the data either from the write buffer to the read buffer or vice versa, depending on the number of copies required. For example, if the write buffer contains a single sub-block, the sub-block can be copied into the read buffer (which contains the other sub-blocks of the block). The blocks to be copied can be determined from the bitmap field of the SYSTAG frame associated with the write operation. If the data is merged in the read buffer, the processing device can update the buffer identifier field of the SYSTAG frame of the write operation to point to the read buffer.

At operation 444, the processing device deallocates the unused SYSTAG frame and buffer. For example, if the processing device determined the write buffer was full at operation 440, the SYSTAG and buffer associated with the read operation created at operation 434 can be deallocated. As another example, if the data was merged into the read buffer, the processing device can deallocate the read operation SYSTAG and write buffer. Note that deallocation can free the space taken by the SYSTAG and buffer (if unlocked) or remove the lock associated with the read or write operation (e.g., decrementing a counter). After operation 444, the operations continue to operation 414 of FIG. 4A.

Turning to FIG. 4C, at operation 446, the processing device checks whether the sub-block write operation has data that overlaps with the pending write operation that resulted in the hit (at operation 430). Overlap can be determined from the bitmap field of the SYSTAG frames of the colliding operations. If the colliding operations do not include overlapping data, the same buffer can be used in subsequent operations. For example, if a block write operation can be divided into eight sub-blocks, numbered 0-7, a sub-block write operation to sub-blocks 0-3 colliding with a sub-block write operation to blocks 4-7 could use the same write buffer as any intervening read operations queued against the earlier sub-block write operation could still be fulfilled from the sub-block. As another example, if the two colliding sub-block write operations wrote to sub-block 0, overwriting the earlier sub-block data could result in data loss for any operations queued against the earlier sub-block operation. Performing this check can avoid allocation of another write buffer if the same write buffer can be used for the colliding operations without overwriting data that may be needed by another in-flight operation. If the two write operations include overlapping data, the method 400 continues to operation 458. If the two write operations do not contain overlapping data, the method 400 continues to operation 448.

At operation 448, the processing device associates the write buffer of the earlier write operation that resulted in the collision with the SYSTAG of the new write operation. At operation 450, the processing device fills the sub-blocks of the new write operation in the write buffer. Since there were no overlapping sub-blocks in the two colliding write operations, the processing device can copy the new data into the previously allocated write buffer. The processing device further updates the bitmap field of the SYSTAG frame associated with the write operation to reflect the state of the write data in the buffer (e.g., by OR-ing the SYSTAG bitmap fields of the two colliding write operations).

At operation 452, the processing device updates the pending SYSTAG field of the current write operation with the value in the pending SYSTAG field of the SYSTAG frame associated with the earlier write operation to associated a pending read operation initiated for the earlier sub-block write operation with the current write operation. Note that the update can be conditioned on the validity of the pending SYSTAG field of the earlier write operation (e.g., if it was a full block write operation, there may not be an associated read operation and the pending SYSTAG field would be encoded as invalid).

At operation 454, the processing device has resolved the collision between two write operations, so the SYSTAG frame associated with the earlier write operation and the unused buffer after merger at operation 460 (described below) can be deallocated. Note that deallocation can free the space taken by the SYSTAG and buffer (if unlocked) or remove the lock associated with the read or write operation (e.g., decrementing a counter). For example, if the write buffer associated with the earlier operation had an outstanding read operation against it, the processing device can decrement the lock counter associated with the write buffer from '2' to '1' to indicate the elimination of the associated, earlier write operation, while the read operation remains outstanding.

At operation 456, the processing device checks whether the combined data from the colliding write operations forms a full block operation. For example, if the earlier write operation that resulted in the collision was a full block write operation or the sub-blocks written by two colliding sub-block write operations resulted in a full block operation, the processing device can treat the write operation as a full block write operation without waiting for any associated data to be read from the media to fill the entire block. If the processing device determines the write operation is a full block write, the method 400 continues to operation 414. If the processing device determines that the write operation is not a full block operation, the method 400 continues to operation 438 (in FIG. 4B).

At operation 458, the processing device allocates and fills a write buffer with the data identified with the write operation, such as was described above with reference to operation 412. At operation 460, the processing device copies the non-overlapping data in the write buffer of the earlier write operation into the newly allocated write buffer to avoid overwriting data in the previously allocated write buffer which may be needed for another outstanding operation. The processing device further updates the bitmap field of the SYSTAG frame associated with the write operation to reflect the state of the write data in the buffer (e.g., by OR-ing the SYSTAG bitmap fields of the two colliding write operations).

With reference to FIG. 5 for read operations, at operation 502, the processing device receives a read operation. For example, the host system 120 or an internal media management process of the memory subsystem 110 can issue a read command that identifies a logical address from which to read data from the media. At operation 504, the processing device allocates a SYSTAG frame for the read operation. As indicated above, SYSTAG frames are used to track metadata associated with an operation as the operation is carried out by various processing stages or components of the memory subsystem 110.

At operation 506, the processing device causes a cache check operation to be performed. The check operation provides for checking for collisions within the cache, allowing read operations to be fulfilled from data associated with other in-flight write operations rather than from data stored on the media. For example, the processing device can instruct the CC 113 to check for an entry into the coherency cache 123 to detect a collision with a prior in-flight operation. Further details on the cache check operation are provided below with reference to FIG. 9.

At operation 508, the processing device checks whether the result of the check operation at operation 506 was a hit or a miss. If the processing device determines that the check operation resulted in a miss, the method 500 continues to operation 510. If the processing device determines that the check operation resulted in a hit, the method 500 continues to operation 520.

At operation 510, in response to a cache miss, the processing device allocates a buffer for the read operation and, at operation 512, the processing device initiates the read operation to obtain the data from the media. At operation 514, the processing device transfers or sends the data in the read buffer to the originator of the read operation (e.g., as received at operation 502).

At operation 515, the processing device checks whether the pending SYSTAG field in the SYSTAG frame associated with the read operation is valid. For example, the encoding of the pending SYSTAG field can include one or more bits that indicate the validity of the contents. A valid SYSTAG identifier in the pending SYSTAG field can indicate another operation depends on the operation (e.g., a write operation waiting on data from the completed read operation). If the processing device determines that there is a valid pending operation, the method 500 continues to operation 516. If the processing device determines that there is not a valid pending operation, the method 500 continues to operation 517.

At operation 516, the processing device continues the operation associated with the SYSTAG identified in the pending SYSTAG field. For example, if there was a write operation that was waiting on data from the read operation that initiated the operations of FIG. 5, the processing device continues processing that read operation (e.g., to provide a sub-block write operation with the unmodified data).

At operation 517, the processing device deallocates the read buffer, and, at operation 518, the processing device deallocates the SYSTAG frame associated with the read operation.

At operation 520, having detected a cache hit indicating that the read operation collided with another pending in-flight write operation, the processing device checks whether the buffer associated with the other pending in-flight operation was locked. In some embodiments, the CC 113 attempts to place a lock on the buffer as a part of the check operation initiated at operation 506 and returns an indication of whether the attempt was successful, as described below with reference to FIG. 9. An unsuccessful locking attempt may indicate that another process had already freed the buffer containing the data, such as a media controller having transferred the data from the buffer to another downstream buffer in the memory subsystem. If the processing device determines that a lock was successfully placed on the buffer of the other pending operation, the method 500 continues to operation 530. If the processing device determines that a lock was not successfully placed on the buffer of the other pending operation, the method 500 continues to operation 522.

At operation 522, the processing device sets the pending SYSTAG field of the in-flight write operation that caused the collision to the SYSTAG of the read operation. For example, the processing device can write the SYSTAG identifier of the read operation to the pending SYSTAG identifier field 230 of the SYSTAG frame for the in-flight write operation.

At operation 524, the processing device continues processing of the read operation upon completion of the in-flight write operation that resulted in the hit. As noted above, data transfers to and from media may cause some delay in processing a particular operation. Here, since the buffer could not be locked, the read operation is delayed until the data that was associated with the in-flight write operation is written to media. The processing device can determine when to continue processing of the read operation based on the presence of the SYSTAG associated with the read operation in the pending SYSTAG field of the SYSTAG for the write operation as set at operation 522.

At operation 528, the processing device deallocates the SYSTAG frame associated with the write operation that caused the collision. Such an operation may be conditioned on the successful locking of the SYSTAG frame (but not the buffer) by the CC 113 as part of the cache check operation at operation 506. The deallocation at operation 528 removes the lock imposed by the read operation, if successful. After operation 528, the operations continue to operation 510.

At operation 530, in response to determining a lock was successfully placed on the buffer of the in-flight write operation that caused the hit (the "colliding SYSTAG"), the processing device associates the buffer of the write operation that caused the collision with the read operation. For example, the processing device can update the buffer identifier in the SYSTAG frame of the read operation to identify the write buffer associated with the write operation. In this manner, the processing device redirects the read operation to the buffer of the colliding write operation so that the read operation can be fulfilled from the write buffer.

At operation 532, the processing device deallocates the SYSTAG frame associated with the write operation that caused the collision to remove the lock placed by the CC 113 on the SYSTAG frame of the write operation in performing the check operations at operation 506. The method 500 continues to operation 514 where the processing device can transfer or send the data in the "read" buffer (i.e., the write buffer of the colliding in-flight write operation) to the originator of the read operation.

Although FIGS. 4A-4C and FIG. 5 contemplated single cache operations (e.g., received at operation 402, 502), in some embodiments, the processing device processes reads or writes to a range of addresses or blocks. For example, the length field 215 in the exemplary SYSTAG frame can specify an amount of data that is larger than the block size and/or the next SYSTAG field 210 can be used to chain multiple related operations together. In such embodiments, the CC 113 interface can be configured to process multiple cache operations (e.g., at operations 410, 420, 424, 428, and/or 506). For example, the cache operations can be initiated with reference to a SYSTAG having a starting address and a length or size, or with a list of SYSTAGs, etc.

FIG. 6 is a flow diagram of an example method 600 to insert an entry into cache in accordance with some embodiments of the present disclosure. FIG. 7 is a flow diagram of an example method 700 to conditionally insert an entry into cache in accordance with some embodiments of the present disclosure. FIG. 8 is a flow diagram of an example method 800 to delete an entry from cache in accordance with some embodiments of the present disclosure. FIG. 9 is a flow diagram of an example method 900 to check whether an entry exists in cache in accordance with some embodiments of the present disclosure. FIG. 10 is a flow diagram of an example method 1000 to check whether an entry exists in cache and, if not, insert an entry into cache in accordance with some embodiments of the present disclosure. FIG. 11 is a flow diagram of an example method 1100 to update an entry in cache in accordance with some embodiments of the present disclosure. The methods 600, 700, 800, 900, 1000, 1100 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods 600, 700, 800, 900, 1000, 1100 are performed by the CC 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

With reference to FIG. 6 for cache insert operations, at operation 602, the processing device receives an insert command having a SYSTAG and logical address. For example, software executed by the processor 117 can initiate a cache insert operation with the CC 113 (e.g., at operation 410 of FIG. 4). At operation 604, the processing device determines a hash tag and current cache pointer from logical address. In one embodiment, the processing device calculates the hash tag by right-shifting the bits of the logical address by the base 2 logarithm of the number of rows of the cache structure. The current cache pointer represents the location in the cache structure (or extension) for the logical address. As indicated above, the cache row can be calculated using the modulo function and the number of rows R in the cache structure (cache row=logical address % R). If each row in the cache structure has an address, the cache pointer is the address of the calculated row.

At operation 606, the processing device checks whether a slot at the current cache pointer matches the hash tag. For example, the processing device can check whether the hash tag field 305 of a slot matches the hash tag of the calculated at operation 604. In the 3-way associative cache structure illustrated in FIG. 3A, the processing device checks for a match in each of the three slots. If the processing device determines that there is a match, the method 600 continues to operation 608. At operation 608, the processing device sets the SYSTAG field in slot having the matching hash tag to the SYSTAG of the command, overwriting the existing entry in the cache structure (e.g., for a write operation that supersedes a previous write operation to the same location).

If, at operation 606, the processing device determines that there is not a match, the method 600 continues to operation 612. A loop made of operations 606, 612, 614, 616, and 628 iterates through the row extensions, if any, to continue to search the cache for an entry in the cache row that matches the hash tag. At operation 612, the processing device checks whether a slot at the current cache pointer is invalid. As indicated above, the hash tag and/or SYSTAG field of a slot can be encoded to indicate whether the slot is valid. For example, the processing device checks whether any of the three slots in the 3-way associative cache structure illustrated in FIG. 3A are invalid.

If, at operation 612, the processing device determines that there is an invalid slot, the method 600 continues to operation 614. At operation 614, the processing device saves the position of the invalid slot. For example, the saved slot variable can be initialized to an invalid value so that when a slot is saved the variable is set to a valid state. The processing device can use the position of the saved invalid slot to complete the insert operation in the first invalid slot if, upon searching the entire row and row extension, the processing device determines there is not a match. Note that in some embodiments, the processing device saves the position of the first invalid slot (and not the position of later invalid slots as the processing device iterates through any remaining row extensions). For example, the saved slot variable at operation 614 is only updated when its current value is the initialized invalid value so that subsequent iterations through the loop do not result in an update.

If, at operation 612, the processing device determines that there is not an invalid slot, the method 600 continues to operation 616. At operation 616, the processing device checks whether the row extension field associated with the current cache pointer is valid. For example, after evaluating a row of the cache structure of FIG. 3A, the processing device iterates through the chained row extensions, if valid. If the processing device determines that the row extension associated with the current cache pointer is valid, the method 600 continues to operation 628, where the processing device updates the current cache pointer to the address of the valid row extension, and the method 600 proceeds to operation 606, completing a single iteration of the loop. If, at operation 616, the processing device determines that the row extension associated with the current cache pointer is invalid, the method 600 continues to operation 618.

At operation 618, the processing device checks whether an invalid slot was saved at operation 614. The determination can be made based on an encoding of the saved slot variable. If the processing device determines that there is a saved slot, at operation 620, the processing device sets the hash tag and SYSTAG fields of saved slot to the hash tag and SYSTAG of the insert operation (determined at operation 604).

If, at operation 618, the processing device determines that there is not a saved slot, the method 600 continues to operation 622. In this scenario, the row and any valid row extensions were full. As a result, at operation 622, the processing device allocates a SYSTAG frame for use as a row extension. At operation 624, the processing device sets the row extension field to the address of the allocated SYSTAG frame. The row extension field may be the field 315 in a row of the cache structure as illustrated in FIG. 2 or the field 315 in a cache row extension as illustrated in FIG. 3, depending on whether the newly allocated SYSTAG frame is the first row extension. At operation 626, the processing device sets the hash tag and SYSTAG fields of the first slot of the allocated SYSTAG frame to the to hash tag and SYSTAG of the insert operation (determined at operation 604).

In some embodiments, once an entry for the operation has been identified or inserted into the cache structure (e.g., at operation 608, 620, or 626), the processing device re-initializes the saved slot variable (if used) to an invalid value.

With reference to FIG. 7, at operation 702, the processing device receives a conditional insert command having an associated SYSTAG and logical address. For example, software executed by the processor 117 can initiate a conditional insert operation with the CC 113 (e.g., at operation 424 of FIG. 4). The conditional insert operations can be performed to insert an entry into the cache when there is no prior colliding entry. For example, a garbage collection process may attempt to relocate data on media and issue a read operation to read the data to be moved and later issue a write operation to write the read data to a new location. If, however, another operation wrote to the logical address associated with the data being moved, the garbage collection write operation should not supersede the intervening write operation as it would be writing old data. At operations 704, 706, 712, 714, 716, and 728, the processing device performs operations similar to those described above with reference to operations 604, 606, 612, 614, 616, and 628 of FIG. 6, respectively, to search the cache structure for a hit. At operation 706, however, if the processing device determines that there is a match, the method 700 continues to operation 710 for conditional insert operations (rather than operation 608). At operation 710, the processing device returns an indication of a hit to the initiator of the conditional insert operation.

With reference to FIG. 8, at operation 802, the processing device receives a delete command having a SYSTAG and logical address. For example, software executed by the processor 117 can initiate a cache delete operation with the CC 113 (e.g., at operation 420 of FIG. 4, at operation 526 of FIG. 5). At operation 804, the processing device determines a hash tag and current cache pointer from logical address, as described above with reference to operation 604.

At operation 806, the processing device checks whether a slot at the current cache pointer matches the hash tag, as described above with reference to 606. If the processing device determines that there is not a match, the method 800 continues to operation 826. A loop made of operations 806, 826, and 828 iterates through the row extensions, if any, to continue to search the cache for an entry in the cache row that matches the hash tag. At operation 826, the processing device checks whether the row extension field associated with the current cache pointer is valid. If the processing device determines that the row extension is valid, the method 800 continues to operation 828. At operation 828, the processing device saves the current cache pointer and sets the current cache pointer to identify the valid row extension and returns to operation 806 to test the slots in the row extension. Saving a pointer in the saved cache pointer variable validates the variable for later use as described below (e.g., at operation 812). Prior to entering the loop of operations 806, 826, and 828, the processing device can encode the variable as invalid (e.g., by setting one or more bits in the variable to an invalid state). Note that in contrast to saving the first invalid slot at operations 614 and 714, the processing device overwrites the saved current cache pointer in each iteration of the loop to be later for consolidating cache extensions (as described below). An invalid cache pointer variable indicates that the current cache pointer is directed to a row of the cache structure (rather than a row extension). If, at operation 826, the processing device determines that the row extension is invalid, the method 800 continues to operation 830. At this stage, the processing device has exhausted the cache searching for the entry to be deleted. Since the request could not be performed, the processing device returns an error or exception to the processing that initiated the cache delete operation.

Returning to operation 806, if the processing device determines that there is a match, the method 800 continues to operation 808. At operation 808, the processing device invalidates the slot that resulted in the match. For example, the processing device can encode the hash tag field 305 and/or SYSTAG field 310 in the slot to indicate the contents of the slot are invalid.

At operation 810, the processing device checks whether all of the slots at the current cache pointer are invalid. For example, in the three-way cache structure of FIG. 3A, if the processing device invalidated slot 2 at operation 806, the processing device checks whether slots 1 and 3 are also invalid. If the processing device determines that at least one of the other slots at the current cache pointer is valid, the method 800 continues to operation 824, where the processing device can send an indication that the delete operation was successfully performed. If the processing device determines that all of the slots at the current cache pointer are invalid, the method 800 continues to operation 812 to consolidate row extensions, if any.

The operations at operations 812, 814, 815, 816, 818, 820, and 822 work to compact or eliminate a row extension, if any, since each of the slots at the current cache pointer are invalid. At operation 812, the processing device checks whether there is a valid cache pointer saved (e.g., from operation 828). The valid saved cache pointer identifies a cache row or row extension that is extended by the current cache pointer. The determination can be made based on a valid value in the saved cache pointer variable. A valid saved cache pointer variable is an indicator that the current cache pointer is pointing to a row extension (e.g., as shown in FIG. 3B) rather than a row in the hash structure (as shown in FIG. 3A). If the processing device determines that the saved cache pointer is valid (e.g., that the invalidated cache slot was in a row extension), the method 800 continues to operation 814.

At operation 814, the processing device checks whether the row extension at the current cache pointer is valid. If the row extension is valid, the current cache pointer identifies a row extension that is extended by another row extension. If the processing device determines that the row extension is invalid, the method 800 continues to operation 815. If the processing device determines that that the row extension is valid, the method 800 continues to operation 818.

At operation 815, the processing device invalidates the row extension field of the saved cache pointer. Since the row extension of the current cache pointer was invalid, the current cache pointer contains only invalid slots and was the last row extension in the chain. Setting the row extension field of the saved cache pointer to invalid eliminates the last row extension in the chain. At operation 816, the processing device deallocates the SYSTAG frame that was repurposed for the current row extension.

At operation 818, the processing device updates the row extension field at the saved cache pointer to identify the row extension identified by the current cache pointer, removing the row extension identified from the current cache pointer from the chain. Once removed, the processing device deallocates the SYSTAG frame that was repurposed for the current row extension at operation 816 and the method 800 proceeds to operation 824.

Returning to operation 812, if the processing device determines that the saved cache pointer is invalid (e.g., indicating that the invalidated cache slot was in a row of the coherency cache rather than in a row extension), the method 800 continues to operation 820.

At operation 820, the processing device checks whether the row extension at the current cache pointer is valid (e.g., based on an encoding of the value in the row extension field 315). If the processing device determines that the row extension is invalid, the method 800 continues to operation 824. If the processing device determines that that the row extension is valid, the method 800 continues to operation 822. At operation 822, the processing device copies the contents of the row extension into the cache row. In this scenario, the row of the coherency cache does not contain any valid slots, so the row extension is copied into the row. Once copied, the processing device can deallocate the SYSTAG frame that was repurposed for the row extension.

At operation 824, the processing device returns an indication of the result (e.g., that the requested entry was successfully deleted).

With reference to FIG. 9, at operation 902, the processing device receives a check command having a SYSTAG and logical address. For example, software executed by the processor 117 can initiate a check operation with the CC 113 (e.g., at operation 506 of FIG. 5). At operation 904, the processing device determines a hash tag and current cache pointer from logical address, as described above with reference to operation 604.

At operation 906, the processing device checks whether a slot at the current cache pointer matches the hash tag. If the processing device determines that there is a match, the method 900 continues to operation 908. At operation 908, the processing device attempts to place a lock on the SYSTAG frame identified in the matching slot. For example, the processing device can attempt to increment a counter representing a lock on the SYSTAG frame.

At operation 910, the processing device checks whether the attempt to lock the SYSTAG was successful. The lock attempt may be unsuccessful if the counter associated with the SYSTAG frame was zero, for example, indicating the contents of the SYSTAG frame were unlocked and potentially modified. In such a case, the method continues to operation 912, where the processing device returns an error or exception to indicate that there was a hit in the cache but the SYSTAG could not be locked. If the processing device determines that the lock attempt was successful, the method 900 continues to operation 914. At operation 914, the processing device checks whether the buffer identified in the locked SYSTAG is valid based on, for example, the encoding of the buffer identifier field 205 in the SYSTAG frame. If the processing device determines that the buffer is invalid, the method 900 continues to operation 918, described below.

If the processing device determines that the buffer is valid, the method 900 continues to operation 920 where the processing device attempts to place a lock on the buffer associated with the SYSTAG from the matching slot. For example, the processing device can attempt to increment a counter representing a lock on the buffer.

At operation 922, the processing device checks whether the attempt to lock the buffer was successful. The lock attempt may be unsuccessful if the counter associated with the buffer was zero, for example, indicating the contents of the buffer were unlocked and potentially modified. In such a case, the method continues to operation 924 where the processing device sets an indication of the buffer status to reflect the buffer was not locked. If the processing device determines that the attempt to lock the buffer was successful, the method 900 continues to operation 926 where the processing device sets an indication of the buffer status to reflect the buffer was locked.

At operation 918, the processing device returns an indication that there was a hit and the associated buffer status—such as whether the buffer was invalid or was successfully or unsuccessfully locked.

Returning to operation 906, if the processing device determines that there is not a match, the method 900 continues to operation 928. A loop made of operations 906, 928, and 932 iterates through the row extensions, if any, to continue to search the cache for an entry in the cache row that matches the hash tag.

At operation 928, the processing device checks whether the row extension field associated with the current cache pointer is valid. If the processing device determines that the row extension associated with the current cache pointer is valid, the method 900 continues to operation 932 where the processing device updates the current cache pointer to the address of the valid row extension. If, at operation 928, the processing device determines that the row extension associated with the current cache pointer is invalid, the method 600 continues to operation 930 where the processing device returns an indication of a miss.

With reference to FIG. 10, at operation 1002, the processing device receives a check and insert command having an associated SYSTAG and logical address. For example, software executed by the processor 117 can initiate a check and insert command with the CC 113 (e.g., at operation 428 of FIG. 4). At operations 1004, 1006, 1012, 1014, 1016, and 1028, the processing device performs operations similar to those described above with reference to operations 604, 606, 612, 614, 616, and 628 of FIG. 6, respectively, to search the cache structure for a hit. When there is no match after searching the row and row extensions (if any), the method 1000 continues to operation 618 of FIG. 6 to insert an entry into the cache structure. At operation 1006, however, if the processing device determines that there is a match, the method 1000 continues to operation 914 where the processing device carries out operations as described above with reference to FIG. 9. For example, if the SYSTAG was unable to be locked (at operation 908), the processing device returns an error or exception to indicate that there was a hit in the cache but the SYSTAG could not be locked to whatever initiated the check and insert operation. If the SYSTAG was locked, as indicated on FIG. 9, the operations at operation 914, 924, and 926 return to operation 1008 of FIG. 10 for check and insert operations.

At operation 1008, the processing device saves the SYSTAG of the cache entry that resulted in the match to later return to the originator of the check and insert operation. At operation 1010, the processing device sets the SYSTAG field in the matching slot to the SYSTAG associated with the check and insert operation, replacing the saved SYSTAG. This updates the cache to reflect the later write operation for detection of subsequent collisions. At operation 1012, the processing device returns an indication of the hit, the saved SYSTAG (from operation 1008), and the buffer status. The initiator of the check and insert operation can use the returned information to handle the sub-block write operations. For example, the software executed by the processor 117 can use the SYSTAG submitted with the check and insert operation and the SYSTAG that resulted in a cache hit to locate and combine buffers as described above with reference to FIG. 4 (e.g., operations 428, 430, 446, and so on).

With reference to FIG. 11 for cache update operations, at operation 1102, the processing device receives an update command having a new SYSTAG, target SYSTAG, and logical address. For example, software executed by the processor 117 can initiate an update operation with the CC 113. At operation 1104, the processing device determines a hash tag and current cache pointer from logical address, as described above with reference to operation 604. At operation 1106, the processing device checks whether a slot at the current cache pointer matches the hash tag, as described above with reference to 606. If the processing device determines that there is a match, the method 1100 continues to operation 1108.

At operation 1108, the processing device checks whether the SYSTAG in the matching slot matches the target SYSTAG. If the processing device determines that the SYSTAGs do not match, the method 1100 continues to operation 1114 where the processing device returns an indication of a miss. If the processing device determines that the SYSTAGs match, the method 1100 continues to operation 1110. At operation 1110, the processing device updates the SYSTAG field in the slot with the new SYSTAG, and, at operation 1112, the processing device returns an indication of a hit or otherwise successful update of the cache.

Returning to operation 1106, if the processing device determines that there is not a match, the method 1100 continues to operation 1116. A loop made of operations 1106, 1116, and 1120 iterates through the row extensions, if any, to continue to search the cache for an entry in the cache row that matches the hash tag. At operation 1116, the processing device checks whether the row extension field associated with the current cache pointer is valid. If the processing device determines that the row extension is valid, the method 1100 continues to operation 1120. At operation 1120, the processing device sets the current cache pointer to identify the valid row extension and returns to operation 1116 to test the slots in the row extension. If, at operation 1116, the processing device determines that the row extension is invalid, the method 1100 continues to operation 1118. At this stage, the processing device has exhausted the cache searching for the entry to be updated. Since the request could not be performed, the processing device returns an error or exception to the processing that initiated the cache update operation, in some embodiments.

Although the methods 600, 700, 800, 900, 1000, and 1100 refer to operations on a single logical address and SYSTAG, the operations associated with those methods can be extended to handle a range of addresses and list of SYSTAGs.

Figure 12:
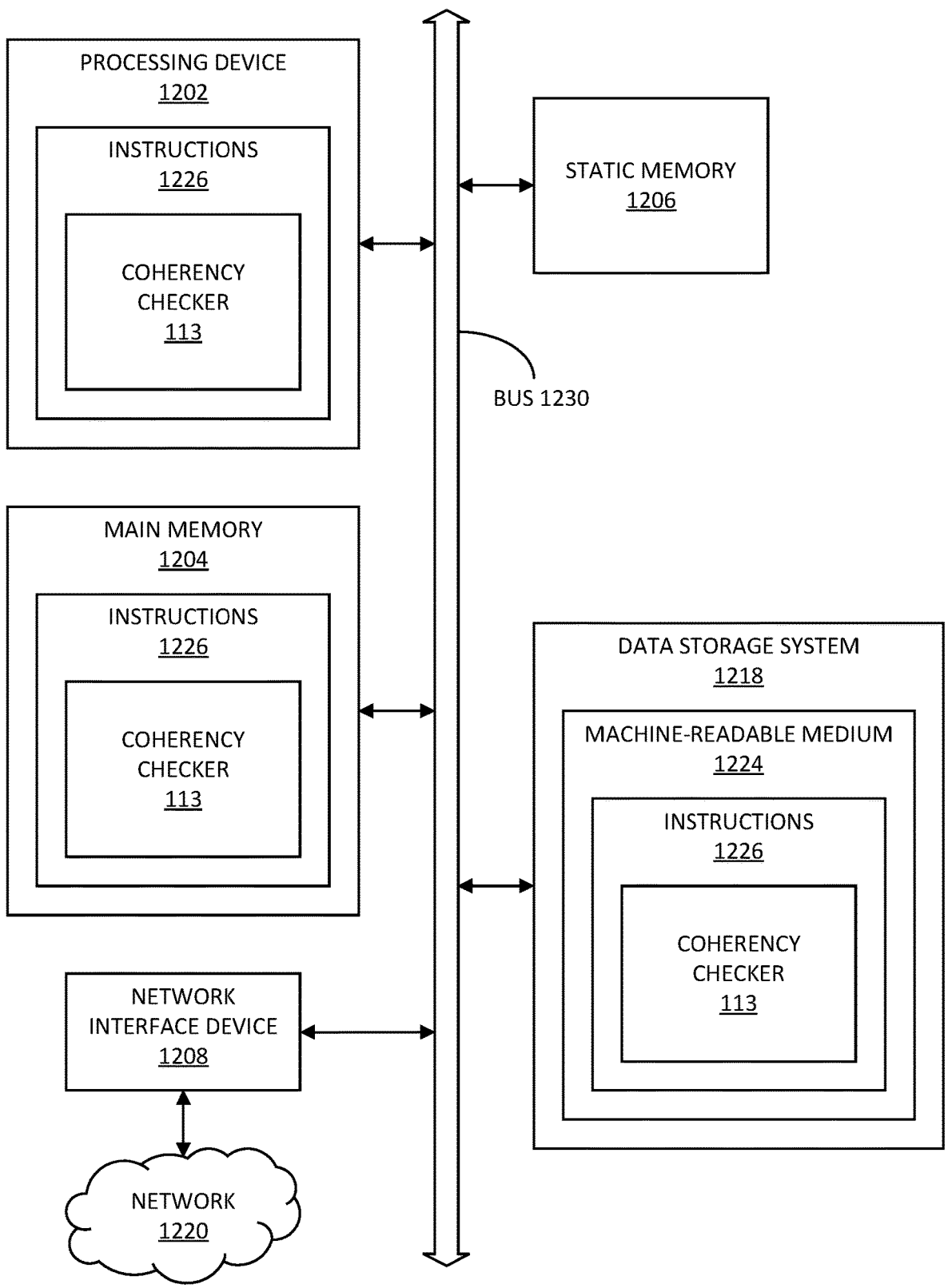
FIG. 12 is a block diagram of an example computer system in which embodiments of the present disclosure may operate.

FIG. 12 illustrates an example machine of a computer system 1200 within which a set of instructions, for causing the machine to perform any one or more of the methodologies discussed herein, can be executed. In some embodiments, the computer system 1200 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the CC 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage system 1218, which communicate with each other via a bus 1230.

Processing device 1202 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 can also be one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein. The computer system 1200 can further include a network interface device 1208 to communicate over the network 1220.

The data storage system 1218 can include a machine-readable storage medium 1224 (also known as a computer-readable medium) on which is stored one or more sets of instructions 1226 or software embodying any one or more of the methodologies or functions described herein. The instructions 1226 can also reside, completely or at least partially, within the main memory 1204 and/or within the processing device 1202 during execution thereof by the computer system 1200, the main memory 1204 and the processing device 1202 also constituting machine-readable storage media. The machine-readable storage medium 1224, data storage system 1218, and/or main memory 1204 can correspond to the memory subsystem 110 of FIG. 1.

In one embodiment, the instructions 1226 include instructions to implement functionality corresponding to a coherency checker component (e.g., the CC 113 of FIG. 1). While the machine-readable storage medium 1224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, can carry out the computer-implemented methods 400, 500, 600, 700, 800, 900, 1000, and 1100 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving a current request to write data to an address of a memory component, the current request assigned a buffer to store the data, a first tag based on the address, and an identifier entry identifying metadata for the current request to write data to the address;
   determining that the current request to write data collides with an earlier request to write data to the address based on the earlier request being assigned a second tag that matches the first tag; and
   overwriting an identifier entry identifying metadata for the earlier request to write data to the address with the identifier entry identifying metadata for the current request to write data to the address in response to determining the current request collides with the earlier request.

2. The method of claim 1, further comprising:
   determining that the current request to write data originated from a host device.

3. The method of claim 1, further comprising:
   allocating and filling a write buffer with data identified by the current request to write data.

4. The method of claim 1, wherein determining that the request to write data collides with the earlier request is based on a match of a hash of the address to an entry in a row or an extension of the row of an N-way associative cache structure.

5. The method of claim 4, wherein the row is identified based on the address and a number of rows in the cache structure.

6. The method of claim 4, wherein the extension of the row and the first tag are of the same size of data.

7. The method of claim 1,
   wherein the identifier entry identifying metadata for the current request to write data to the address includes information identifying one or more buffers for storing the write data of the current request to write data; and
   wherein the identifier entry identifying metadata for the earlier request to write data to the address includes information identifying one or more buffers for storing the write data of the earlier request to write data.

8. A non-transitory computer-readable storage medium comprising instructions that, when executed by a processing device, cause the processing device to:
   receive a current request to write data to an address of a memory component, the current request assigned a buffer to store the data, a first tag based on the address, and an identifier entry identifying metadata for the current request to write data to the address;
   determine that the current request to write data collides with an earlier request to write data to the address based on the earlier request being assigned a second tag that matches the first tag; and
   overwrite an identifier entry identifying metadata for the earlier request to write data to the address with the identifier entry identifying metadata for the current request to write data to the address in response to determining the current request collides with the earlier request.

9. The non-transitory computer-readable medium of claim 8, wherein the processing device is further to:
   determine that the current request to write data originated from a host device.

10. The non-transitory computer-readable medium of claim 8, wherein the processing device is further to:
    allocate and fill a write buffer with data identified by the current request to write data.

11. The non-transitory computer-readable medium of claim 8, wherein determining that the request to write data collides with the earlier request is based on a match of a hash of the address to an entry in a row or an extension of the row of an N-way associative cache structure.

12. The non-transitory computer-readable medium of claim 11, wherein the row is identified based on the address and a number of rows in the cache structure.

13. The non-transitory computer-readable medium of claim 11, wherein the extension of the row and the first tag are of the same size of data.

14. The non-transitory computer-readable medium of claim 8,
    wherein the identifier entry identifying metadata for the current request to write data to the address includes information identifying one or more buffers for storing the write data of the current request to write data; and
    wherein the identifier entry identifying metadata for the earlier request to write data to the address includes information identifying one or more buffers for storing the write data of the earlier request to write data.

15. A system comprising:
    a memory device; and
    a processing device, operatively coupled with the memory device, to:
    receive a current request to write data to an address of a memory component, the current request assigned a buffer to store the data, a first tag based on the address, and an identifier entry identifying metadata for the current request to write data to the address;
    determine that the current request to write data originated from a host device and that the current request to write data collides with an earlier request to write data to the address based on the earlier request being assigned a second tag that matches the first tag; and
    overwrite an identifier entry identifying metadata for the earlier request to write data to the address with the identifier entry identifying metadata for the current request to write data to the address in response to determining the current request collides with the earlier request.

16. The system of claim 15, wherein the processing device is further to:
    allocate and fill a write buffer with data identified by the current request to write data.

17. The system of claim 15, wherein determining that the request to write data collides with the earlier request is based on a match of a hash of the address to an entry in a row or an extension of the row of an N-way associative cache structure.

18. The system of claim 17, wherein the row is identified based on the address and a number of rows in the cache structure.

19. The system of claim 17, wherein the extension of the row and the first tag are of the same size of data.

20. The system of claim 15,
   wherein the identifier entry identifying metadata for the current request to write data to the address includes information identifying one or more buffers for storing the write data of the current request to write data; and
   wherein the identifier entry identifying metadata for the earlier request to write data to the address includes information identifying one or more buffers for storing the write data of the earlier request to write data.

* * * * *